(12) United States Patent
Sumasu et al.

(10) Patent No.: US 11,523,337 B2
(45) Date of Patent: *Dec. 6, 2022

(54) WIRELESS COMMUNICATION DEVICE AND WIRELESS COMMUNICATION METHOD

(71) Applicant: Sun Patent Trust, New York, NY (US)

(72) Inventors: Atsushi Sumasu, Fukuoka (JP); Daichi Imamura, Kanagawa (JP); Ayako Horiuchi, Kanagawa (JP); Yasuaki Yuda, Kanagawa (JP)

(73) Assignee: SUN PATENT TRUST, New York, NY (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/860,451

(22) Filed: Apr. 28, 2020

(65) Prior Publication Data

US 2020/0260378 A1 Aug. 13, 2020

Related U.S. Application Data

(63) Continuation of application No. 16/388,072, filed on Apr. 18, 2019, now Pat. No. 10,681,635, which is a (Continued)

(30) Foreign Application Priority Data

Jun. 16, 2010 (JP) ................................ 2010-137339

(51) Int. Cl.
  *H04W 52/02* (2009.01)
  *H04B 17/309* (2015.01)
  (Continued)

(52) U.S. Cl.
  CPC ...... *H04W 52/0216* (2013.01); *H04B 17/309* (2015.01); *H04J 11/005* (2013.01);
  (Continued)

(58) Field of Classification Search
  CPC ............. H04W 52/0216; H04W 24/08; H04W 52/0206; H04W 72/005; H04L 5/005; H04L 27/12; H04L 12/189
  See application file for complete search history.

(56) References Cited

U.S. PATENT DOCUMENTS

2005/0105460 A1  5/2005 Suh et al.
2008/0232395 A1  9/2008 Buckley et al.
(Continued)

OTHER PUBLICATIONS

3GPP TR 36.814 V9.0.0 (Mar. 2010), "3rd Generation Partnership Project; Technical Specification Group Radio Access Network; Evolved Universal Terrestrial Radio Access (E-UTRA); Further advancements for E-UTRA physical layer aspects (Release 9)".
(Continued)

*Primary Examiner* — Chi Ho A Lee
(74) *Attorney, Agent, or Firm* — Pearne & Gordon LLP

(57) ABSTRACT

The transmission of a reference signal, such as a CSI-RS, is enabled while maintaining a power saving effect when performing inter-cell cooperative transmission/reception or the like in a plurality of cells. In order to realize inter-cell cooperative transmission/reception, a CSI-RS which is used for estimating the state of a spatial propagation path of a communication line is generated by a CSI-RS generation unit, and the CSI-RS is disposed in a predetermined subframe by a disposition unit and transmitted. At this time, when a frame has ten subframes #0 to #9, the CSI-RS is disposed in the subframes #4 and #9, which are subframes excluding the subframes #0 and #5 incapable of transmitting a CSI-RS and are subframes other than subframes capable of acting as MBSFN subframes when discontinuous communication (Extended Cell DTX) is performed so as to achieve power saving, and transmitted.

5 Claims, 21 Drawing Sheets

Related U.S. Application Data continuation of application No. 16/008,184, filed on Jun. 14, 2018, now Pat. No. 10,313,973, which is a continuation of application No. 15/665,892, filed on Aug. 1, 2017, now Pat. No. 10,028,219, which is a continuation of application No. 15/214,564, filed on Jul. 20, 2016, now Pat. No. 9,769,754, which is a continuation of application No. 14/811,464, filed on Jul. 28, 2015, now Pat. No. 9,490,922, which is a continuation of application No. 14/588,712, filed on Jan. 2, 2015, now Pat. No. 9,143,969, which is a continuation of application No. 13/704,010, filed as application No. PCT/JP2011/002802 on May 19, 2011, now Pat. No. 8,942,176.

(51) Int. Cl.
    *H04L 5/00* (2006.01)
    *H04L 12/18* (2006.01)
    *H04J 11/00* (2006.01)
    *H04L 27/12* (2006.01)
    *H04W 24/08* (2009.01)
    *H04W 72/00* (2009.01)

(52) U.S. Cl.
    CPC ............ *H04L 5/005* (2013.01); *H04L 5/0007* (2013.01); *H04L 5/0048* (2013.01); *H04L 12/18* (2013.01); *H04L 12/189* (2013.01); *H04L 27/12* (2013.01); *H04W 24/08* (2013.01); *H04W 52/0206* (2013.01); *H04W 72/005* (2013.01); *H04J 11/0053* (2013.01); *H04J 11/0056* (2013.01); *Y02D 30/70* (2020.08)

(56) References Cited

U.S. PATENT DOCUMENTS

| | | | |
|---|---|---|---|
| 2009/0135803 A1 | 5/2009 | Luo et al. | |
| 2010/0027512 A1 | 2/2010 | Kishiyama et al. | |
| 2010/0118706 A1 | 5/2010 | Parkvall et al. | |
| 2010/0246712 A1 | 9/2010 | Suo et al. | |
| 2010/0272004 A1 | 10/2010 | Maeda et al. | |
| 2010/0315963 A1 | 12/2010 | Jading et al. | |
| 2011/0150049 A1 | 6/2011 | Dent | |
| 2011/0211467 A1 | 9/2011 | Bhat | |
| 2011/0228718 A1 | 9/2011 | Noh et al. | |
| 2012/0257553 A1 | 10/2012 | Noh et al. | |
| 2013/0315191 A1 | 11/2013 | Yoshimoto et al. | |
| 2014/0029696 A1 | 1/2014 | Yoon et al. | |
| 2014/0241232 A1 | 8/2014 | Damji et al. | |
| 2014/0369293 A1 | 12/2014 | Guo et al. | |

OTHER PUBLICATIONS

R1-101676, Huawei, NTT DoCoMo, Nokia, Nokia Siemens Networks, ZTE, Panasonic, Texas Instruments, "CSI-RS simulation assumptions", 3GPP TSG RAN WG1 Meeting #60, Feb. 22-26, 2010.

R1-100498, NTT DoCoMo, "CSI-RS Inter-cell Design Aspects", 3GPP TSG RAN WG1 Meeting #59bis, Jan. 18-22, 2010.

3GPP TS 36.300 V9.3.0 (Mar. 2010), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)".

R1-100144, Samsung, "Considerations on Extended Cell DTX", 3GPP TSG RAN WG1 Meeting #59bis, Jan. 18-22, 2010200.

3GPP TS 36.331 V9.2.0 (Mar. 2010),"3rd Generation Partnership Project; Technical Specification Group Radio Access Network; Evolved Universal Terrestrial Radio Access (E-UTRA); Radio Resource Control (RRC); Protocol specification (Release 9)".

"CSI-RS Pattern Design for LTE-Advanced" 3GPP TSG-RAN WG1 Meeting #60, R1-1000969, Feb. 22, 2010, p. 1-7.

Extended cell DTX for enhanced energy-efficient network operation, 3GPP TSG-RAN WG1 #59, R1-095011, Nov. 9, 2009, p. 1-6.

International Search Report for PCT/JP2011/002802 dated Aug. 9, 2011.

3GPP TSG RAN WG1 #61, R1-103045, Inter-cell CSI-RS design considering Type 1 Relay, Samsung, May 10-14, 2010, Montreal, Canada.

Pattern 1

Pattern 3

Pattern 4

Pattern 5

WIRELESS COMMUNICATION DEVICE AND WIRELESS COMMUNICATION METHOD

CROSS-REFERENCE TO RELATED APPLICATIONS

This is a continuation of U.S. patent application Ser. No. 16/388,072 filed on Apr. 18, 2019 and issued as U.S. Pat. No. 10,681,635 on Jun. 9, 2020, which is a continuation of U.S. patent application Ser. No. 16/008,184 filed on Jun. 14, 2018 and issued as U.S. Pat. No. 10,313,973 on Jun. 4, 2019, which is a continuation of U.S. patent application Ser. No. 15/665,892 filed on Aug. 1, 2017 and issued as U.S. Pat. No. 10,028,219 on Jul. 17, 2018, which is a continuation of U.S. patent application Ser. No. 15/214,564 filed on Jul. 20, 2016 and issued as U.S. Pat. No. 9,769,754 on Sep. 19, 2017, which is a continuation of U.S. patent application Ser. No. 14/811,464 filed on Jul. 28, 2015 and issued as U.S. Pat. No. 9,490,922 on Nov. 8, 2016, which is a continuation of U.S. patent application Ser. No. 14/588,712 filed on Jan. 2, 2015 and issued as U.S. Pat. No. 9,143,969 on Sep. 22, 2015, which is a continuation of U.S. patent application Ser. No. 13/704,010 filed on Dec. 13, 2012 and issued as U.S. Pat. No. 8,942,176 on Jan. 27, 2015, which is a national stage application of International Application No. PCT/JP2011/002802, which claims priority from Japanese Patent Application No. 2010-137339 filed on Jun. 16, 2010. The contents of these applications are herein incorporated by reference in their entirety.

TECHNICAL FIELD

The present invention relates to a wireless communication device and a wireless communication method, and in particular, to a wireless communication device and a wireless communication method for performing inter-cell cooperative transmission/reception or the like in a plurality of cells.

BACKGROUND ART

At present, in ITU-R (International Telecommunication Union-Radiocommunication sector), an IMT (International Mobile Telecommunication)-Advanced system is invited. In 3GPP (3rd Generation Partnership Project), the standardization of LTE-Advanced (LTE-A) which improves system performance is performed while keeping backward compatibility with Rel. 8 LTE (Release 8 Long Term Evolution).

In RAN1 of 3GPP, inter-cell cooperative transmission/reception (CoMP: Coordinated Multi-Point Transmission and Reception) which controls transmission power between many base stations or a transmission base station on the basis of variation in instantaneous interference power is studied. for LTE-A. In order to realize CoMP, as an addition reference signal, a pilot signal (CSI-RS: Channel State Information-Reference Signal) for down space information estimation is studied. The CSI-RS is a reference signal which is used for estimating frequency characteristic information (Channel State Information) of a spatial propagation path of a line (see NPL 1). It is assumed that a base station which supports CoMP transmits a CSI-RS. Here, the base station is a cell or an eNB (enhanced Node-B). The CSI-RS should be transmitted to estimate a line of each cell for CoMP.

FIG. 14 is a schematic view showing when a terminal (UE: User Equipment, mobile station) is given support of CoMP from a plurality of base stations. In order to receive CoMP in a downlink, a terminal 151 should receive CSI-RSs transmitted from a plurality of base stations (cells) 161, 162, and 163, and should accurately estimate space information.

FIG. 15 shows a pattern example (R1-101676) of resource disposition when up to three cells can be multiplexed on four antenna ports as Simulation Assumption agreed on RAN1 #60. FIG. 15 shows resources which constitute one subframe and one RB (Resource Block). In FIG. 15, the vertical axis represents subcarriers (12 subcarriers) of OFDM (Orthogonal Frequency Division Multiplexing) at frequency, and the horizontal axis represents OFDM symbols (14 OFDM symbols of #0 to #13) at time. In FIG. 15, one piece of resource region is one RE (Resource Element). In the pattern example shown in FIG. 15, CSI-RSs of the antenna ports 0 to 3 of a first cell are transmitted with first to fourth subcarriers of an OFDM symbol #10. CSI-RSs of other second and third cells are allocated to other fifth to eighth and ninth to twelfth subcarriers in the same OFDM symbol #10 and transmitted (see NPL 2).

FIGS. 16 to 20 show pattern examples (Patterns 1 to 5) of a plurality of resource dispositions when up to five cells can be multiplexed on eight antenna ports. The examples shown in FIGS. 16 to 20 are pattern examples obtained by slightly correcting the pattern example (R1-100498) (see NPL 3). As in FIG. 15, FIGS. 16 to 20 show resources which constitute one subframe and one RB. In FIGS. 16 to 20, the vertical axis represents subcarriers (12 subcarriers) of OFDM at frequency, and the horizontal axis represents OFDM symbols (14 OFDM symbols of #0 to #13) at time. Five Patterns 1 to 5 can correspond to five cells.

In Pattern 1 shown in FIG. 16, CSI-RSs of the antenna ports 0 to 3 of the first cell are transmitted with the first, second, seventh, and eighth subcarriers of an OFDM symbol #3, and CSI-RSs of the antenna ports 4 to 7 are transmitted with the first, second, seventh, and eighth subcarriers of an OFDM symbol #10. In Pattern 2 shown in FIG. 17, CSI-RSs of the antenna ports 0 to 3 of the second cell are transmitted with the third, fourth, ninth, and tenth subcarriers of an OFDM symbol #3, and CSI-RSs of the antenna ports 4 to 7 are transmitted with the third, fourth, ninth, and tenth subcarriers of an OFDM symbol #10. In Pattern 3 shown in FIG. 18, CSI-RSs of the antenna ports 0 to 3 of the third cell are transmitted with the fifth, sixth, eleventh, and twelfth subcarriers of an OFDM symbol #3, and CSI-RSs of the antenna ports 4 to 7 are transmitted with the fifth, sixth, eleventh, and twelfth subcarriers of an OFDM symbol #10. In Pattern 4 shown in FIG. 19, CSI-RSs of the antenna ports 0 to 3 of the fourth cell are transmitted with the third, fourth, ninth, and tenth subcarriers of an OFDM symbol #5, and CSI-RSs of the antenna ports 4 to 7 are transmitted with the third, fourth, ninth, and tenth subcarriers of an OFDM symbol #12. In Pattern 5 shown in FIG. 20, CSI-RSs of the antenna ports 0 to 3 of the fifth cell are transmitted with the third, fourth, ninth, and tenth subcarriers of an OFDM symbol #6, and CSI-RSs of the antenna ports 4 to 7 are transmitted with the third, fourth, ninth, and tenth subcarriers of an OFDM symbol #13.

In FIGS. 15 to 20, in regard to each resource region divided in an RE unit, a block A (oblique line) is a region where a CRS (Cell-specific Reference Signal) is likely to be transmitted, a block B (dense dot) is a region where a DMRS (DeModulation Reference Signal) is likely to be transmitted, a block C (sparse dot) is a region where a CSI-RS cannot be disposed, and a block D (empty) is a region where a CSI-RS can be disposed. In the block C, the leading three OFDM symbols #0 to #2 are regions where a PDCCH (Physical Downlink Control CHannel) is likely to be transmitted.

As described above, in order that the terminal receives CoMP through a downlink, since it is necessary to receive a CSI-RS transmitted from each base station as an additional reference signal and to accurately estimate space information, the antenna ports of the base stations should orthogonally transmit the CSI-RSs. When multiplexing CSI-RSs while keeping orthogonality, a maximum of five cells of one subframe is considered.

CITATION LIST

Non-Patent Literature

[NPL 1] 3GPP TR 36.814 V9.0.0 (2010-03), "3rd Generation Partnership Project; Technical Specification Group Radio Access Network; Evolved Universal Terrestrial Radio Access (E-UTRA); Further advancements for E-UTRA physical layer aspects (Release 9)"
[NPL 2] R1-101676, Huawei, NTT DoCoMo, Nokia, Nokia Siemens Networks, ZTE, Panasonic, Texas Instruments, "CSI-RS simulation assumptions", 3GPP TSG RAN WG1 Meeting #60, Feb. 22-26, 2010
[NPL 3] R1-100498, NTT DoCoMo, "CSI-RS Inter-cell Design Aspects", 3GPP TSG RAN WG1 Meeting #59bis, Jan. 18-22, 2010
[NPL 4] 3GPP TS 36.300 V9.3.0 (2010-03), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)"
[NPL 5] R1-100144, Samsung, "Considerations on Extended Cell DTX", 3GPP TSG RAN WG1 Meeting #59bis, Jan. 18-22, 2010

SUMMARY OF INVENTION

Technical Problem

In the standardization of LTE-A, for the purpose of power saving of the base station, extended discontinuous transmission (Extended Cell DTX) is studied. In order to extend the period of transmission OFF while keeping backward compatibility with Rel. 8 LTE, Extended Cell DTX using Fake MBSFN subframes under the pretense of MBSFN (Multimedia Broadcast multicast service Single Frequency Network) subframes is studied.

The MBSFN subframes will be described. The MBSFN subframes are subframes for transmitting data for MBMS (Multimedia Broadcast Multicast Service) as a broadcast/multicast service. In the broadcast/multicast service, it is assumed that the same data is transmitted from a plurality of base stations, the characteristic of OFDM which is used as a transmission system in the downlink of LTE or LTE-A is utilized, and a single frequency network mode in which a plurality of cells perform transmission using the same frequency is used (see NPL 4).

Usually, although a base station transmits a CRS in each subframe, and each terminal receives the CRS and measures the quality of the downlink or the like, in the MBSFN subframes, a terminal which does not receive a MBSFN subframe receives only a CRS in a head subframe, and does not receive remaining CRSs in the subframe. For this reason, even when the base station does not actually transmit a service using MBSFN in a certain subframe, if the terminal is notified that a subframe is a MBSFN subframe, since the terminal receives only the head CRS, it should suffice that the base station transmit only the head CRS. Reduction in transmission power using this is network energy saving using Fake MBSFN subframes.

FIG. 21 shows an image example of resource disposition in time series of subframes when Extended Cell DTX using Fake MBSFN subframes is applied. The example shown in FIG. 21 shows subframes (subframes #0 to #9) of a first frame and a second frame with reference to R1-100144 (see NPL 5). In FIG. 21, the horizontal direction represents the elapse of time, and a broken line in the upper portion of each subframe image represents ON/OFF of an amplifier (PA: Power Amplifier). In regard to each OFDM symbol of one subframe, a block A (left downward oblique line) is a symbol which is likely to transmit a CRS, a block B (dense dot) is a symbol which is likely to transmit a PSS (Primary Synchronization Code), a block C (sparse dot) is a symbol which is likely to transmit an SSS (Secondary Synchronization Code), a block D (lattice) is a symbol which is likely to transmit a BCH (Broadcast CHannel), and a block E (right downward oblique line) is a symbol which is likely to transmit an SIB (System Information Block).

Taking into consideration rising or falling of PA, power is required when there is a transmission symbol and also before and after this time. Accordingly, as in the subframes #4 and #9, when the number of transmission symbols is at least temporally dispersed, a power saving effect is lowered. When only the head symbol is transmitted with the application of Fake MBSFN to the subframes #1, #2, #3, #6, #7, and #8 surrounded by a one-dot-chain line frame, the power saving effect is high. When a CSI-RS is transmitted from a base station as an additional reference signal so as to realize CoMP in the downlink, in FIG. 21, a CSI-RS should be disposed in an empty symbol excluding a symbol which is likely to transmit a CRS or the like, and transmitted. However, if a CSI-RS is transmitted with a subframe to which Fake MBSFN is applied, there is a problem in that the power saving effect is lowered.

The invention has been accomplished in consideration of the above-described situation, and an object of the invention is to enable the transmission of a reference signal, such as a CSI-RS, while maintaining a power saving effect.

Solution to Problem

According to one aspect of the present invention, there is provided a wireless communication device including:

a reference signal generation unit configured to generate a reference signal to be used for estimating a state of a spatial propagation path of a communication line;

a disposition unit configured to, when a frame has a plurality of subframes separately disposed on at least a time axis, dispose the reference signal in subframes excluding subframes incapable of transmitting the reference signal from among a plurality of subframes and other than subframes capable of acting as discontinuous communication applicable subframes when discontinuous communication is performed; and a transmission unit configured to transmit a transmission signal including the disposed reference signal.

According to the invention, in the wireless communication device as described above, the reference signal is a signal which is transmitted from each of a plurality of cells and received for estimating a state of a spatial propagation path of a communication line from each cell in one terminal.

Therefore, it becomes possible to dispose and transmit the reference signal used for estimating the state of the spatial propagation path of the communication line without causing damage to the power saving effect by discontinuous communication.

According to the invention, in the wireless communication device as described above, the frame has ten subframes of a subframe #0 to a subframe #9, and the disposition unit is configured to dispose the reference signal excluding the subframes #0 and #5 incapable of transmitting the reference signal, and in at least one of the subframes #4 and #9 which are subframes other than subframes capable of acting as the discontinuous communication applicable subframes.

Therefore, if the reference signal is transmitted using the subframes #4 and #9, it becomes possible to multiplex and transmit the reference signal while keeping inter-cell orthogonality without causing damage to the power saving effect by discontinuous communication when transmitting the reference signal from each of a plurality of cells.

According to the invention, in the wireless communication device as described above, the disposition unit is configured to dispose the reference signal in subframes including the subframes capable of acting as the discontinuous communication applicable subframes when the discontinuous communication is not performed, and dispose the reference signal in subframes other than the subframes capable of acting as the discontinuous communication applicable subframes when the discontinuous communication is performed.

Therefore, it becomes possible to secure the number of reference signals which can be multiplexed in a plurality of cells.

According to the invention, in the wireless communication device as described above, the disposition unit is configured to orthogonally dispose the reference signal such that the reference signal between close cells is multiplexed with the same subframes and the reference signal between cells other than the close cells is multiplexed with different subframes when the discontinuous communication is not performed, and change and dispose the reference signal from subframes acting as the discontinuous communication applicable subframes to subframes other than subframes capable of acting as the discontinuous communication applicable subframes while maintaining orthogonality within the same subframe when the discontinuous communication is performed.

Therefore, it becomes possible to secure the number of reference signals which can be multiplexed in a plurality of cells and to keep orthogonality of the reference signal between close cells which are likely to cause large interference to other cells.

According to the invention, in the wireless communication device as described above, the frame has 10 subframes of a subframe #0 to a subframe #9, and the disposition unit is configured to dispose the reference signal in at least one of the subframes #1, #2, #3, #4, #6, #7, #8, and #9 excluding the subframes #0 and #5 incapable of transmitting the reference signal when the discontinuous communication is not performed, and dispose the reference signal in at least one of the subframes #4 and #9 which are subframes other than subframes capable of acting as the discontinuous communication applicable subframes in regard to subframes acting as the discontinuous communication applicable subframes when the discontinuous communication is performed.

Therefore, it becomes possible to secure the number of reference signals in a plurality of cells and to keep orthogonality of the reference signal between close cells which are likely to cause large interference to other cells, in particular, to the nearest cells.

According to the invention, in the wireless communication device as described above, when disposing the reference signal in subframes other than subframes acting as the discontinuous communication applicable subframe when the discontinuous communication is performed, the disposition unit is configured to dispose the reference signal in subframes other than subframes capable of acting as the discontinuous communication applicable subframe in a different frame.

Therefore, if a subframe in which the reference signal is disposed is expanded to different frames, for example, even when the number of reference signals which are transmitted between a plurality of cells is large, it becomes possible to secure temporal orthogonality and to multiplex a necessary number of reference signals.

According to the invention, the wireless communication device as described above, further including:

a control unit configured to, when the disposition unit disposes the reference signal in subframes other than subframes acting as the discontinuous communication applicable subframes when the discontinuous communication is performed, notify an another communication apparatus of subframe numbers acting as the discontinuous communication applicable subframes.

Therefore, if only the subframe number which acts as a discontinuous communication applicable subframe is notified, even when detailed mapping information is not sent to an anther communication apparatus, it becomes possible to mutually recognize the subframes in which the reference signal is disposed. For this reason, even when complicated mapping information is not sent, it is possible to receive and extract the reference signal on the reception side even after discontinuous communication is performed.

According to another aspect of the present invention, there is provided a wireless communication device including:

a reception unit configured to receive a signal including a reference signal to be used for estimating a state of a spatial propagation path of a communication line;

a separation unit configured to, when a frame has a plurality of frames separately disposed on at least a time axis, separate the reference signal disposed in subframes excluding subframes incapable of transmitting the reference signal and other than subframes capable of acting as discontinuous communication applicable subframes when discontinuous communication is performed from among the plurality of subframes from the received signal on the basis of disposition information of the reference signal; and a space estimation unit configured to estimate the state of the spatial propagation path on the basis of the separated reference signal.

Therefore, it becomes possible to perform space information estimation of the communication line on the basis of the received reference signal to generate space information which is reported to the wireless communication device on the transmission side. At this time, when the reference signals which are transmitted from a plurality of cells in a cellular system and multiplexed between cells are received, it is possible to generate space information which is reported to a wireless communication device of a currently communicating cell and a wireless communication device of an adjacent cell.

According to the invention, in the wireless communication device as described above, the reference signal is a CSI-RS (Channel State Information-Reference Signal) which is used for estimating frequency characteristic information (Channel State Information) of the spatial propagation path of the communication line.

According to the invention, in the wireless communication device as described above, the discontinuous communication applicable subframes are MBSFN (Multimedia Broadcast multicast service Single Frequency Network) subframes which are used for discontinuous communication by Extended Cell DTX (Discontinuous Transmission).

Therefore, when achieving power saving through Extended Cell DTX which is studied in LTE-A, it becomes possible to dispose and transmit a CSI-RS without causing damage to the power saving effect by discontinuous communication.

According to another aspect of the present invention, there is provided a wireless communication method including:

generating a reference signal to be used for estimating a state of a spatial propagation path of a communication line;

when a frame has a plurality of subframes separately disposed on at least a time axis, disposing the reference signal in subframes excluding subframes incapable of transmitting the reference signal and other than subframes capable of acting as discontinuous communication applicable subframes when discontinuous communication is performed from among the plurality of subframes; and transmitting a transmission signal including the disposed reference signal.

According to another aspect of the present invention, there is provided a method of estimating a propagation path, the method including:

receiving a signal including a reference signal to be used for estimating a state of a spatial propagation path of a communication line;

when a frame has a plurality of frames separately disposed on at least a time axis, separating the reference signal disposed in subframes excluding subframes incapable of transmitting the reference signal and other than subframes capable of acting as discontinuous communication applicable subframes when discontinuous communication is performed from among the plurality of subframes from the received signal on the basis of disposition information of the reference signal; and estimating the state of the spatial propagation path on the basis of the separated reference signal.

Advantageous Effects of Invention

According to the invention, it is possible to enable the transmission of the reference signal, such as a CSI-RS, while maintaining the power saving effect.

DESCRIPTION OF EMBODIMENTS

In this embodiment, as a wireless communication system to which a wireless communication device and a wireless communication method according to the invention are applied, a configuration example in a cellular system for mobile communication, such as a mobile phone, is shown. A case where a CSI-RS which is studied in LTE-A is transmitted as an additional reference signal which is used along with a reference signal used heretofore is illustrated. A CSI-RS is a reference signal which is transmitted in a plurality of cells along with a reference signal, such as a CRS, transmitted in each cell so as to realize CoMP, and is used for estimating the state (CSI in LTE-A) of a spatial propagation path of a communication line. In this embodiment, it is assumed that, in a wireless communication system, discontinuous communication is performed to achieve power saving. A case where Extended Cell DTX which is studied in LTE-A is performed as discontinuous communication is illustrated. In Extended Cell DTX, an MBSFN subframe is used as a discontinuous communication applicable subframe when discontinuous communication is performed.

First Embodiment

A first embodiment is a first example of the disposition of a CSI-RS acting as an additional reference signal, and when Extended Cell DTX (discontinuous communication) is performed, a CSI-RS is transmitted with subframes other than subframes capable of acting as MBSFN subframes (discontinuous communication applicable subframes).

Figure 1:
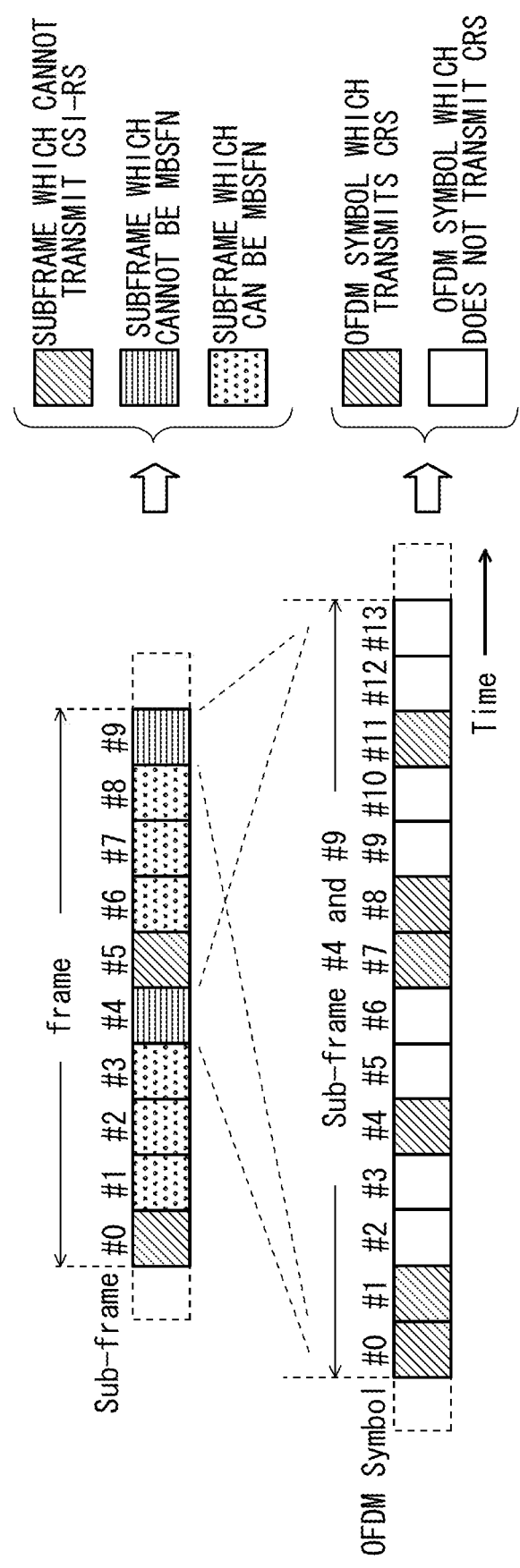
FIG. 1 is a diagram showing the schematic configuration of a frame and a subframe of a transmission signal in a wireless communication system of this embodiment.

FIG. 1 is a diagram showing the schematic configuration of a frame and a subframe of a transmission signal in a wireless communication system of this embodiment. The example of FIG. 1 shows the frame configuration of a transmission signal in a downward direction from a base station (cell) to a terminal in a cellular system, and the horizontal axis represents time.

Figure 21:
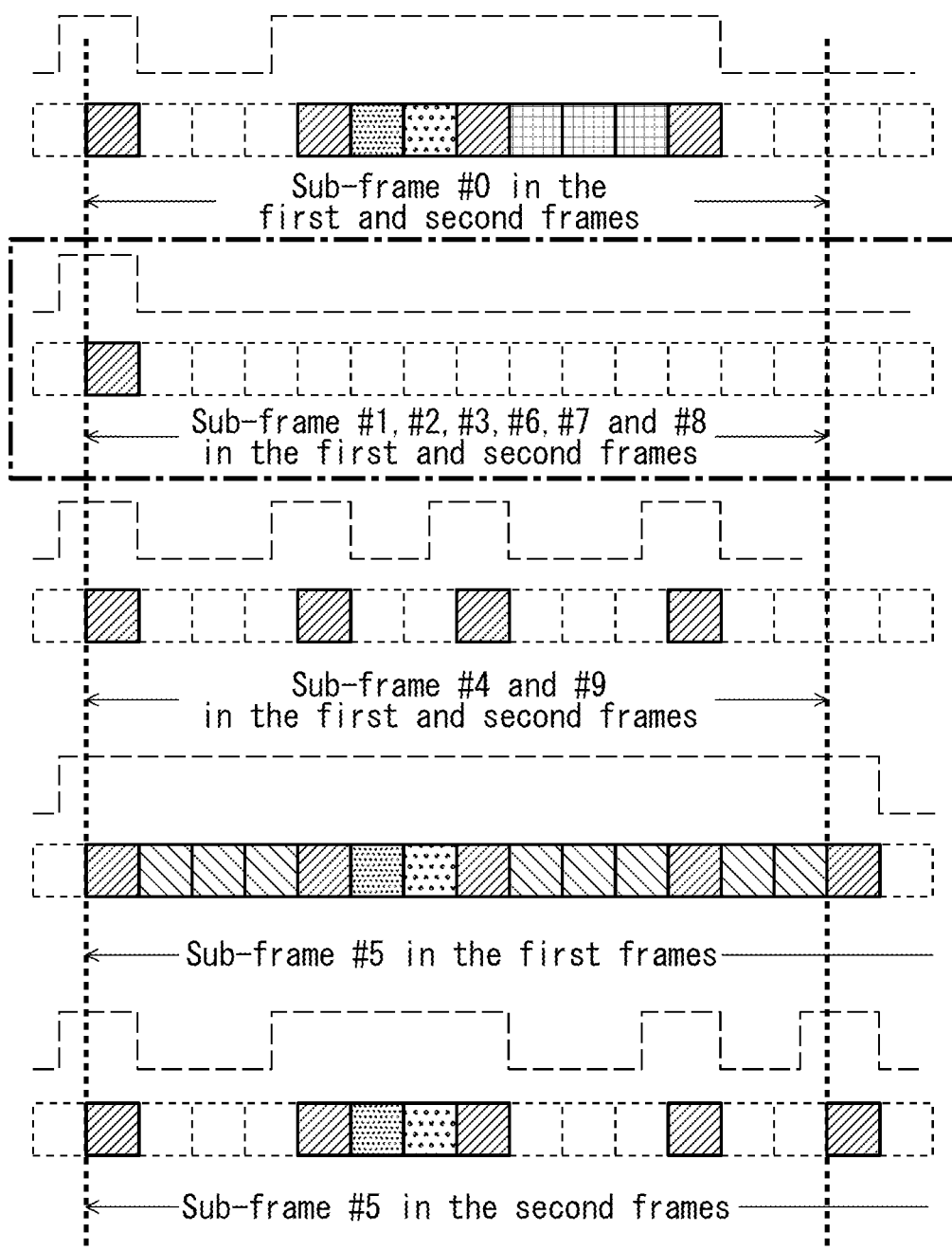
FIG. 21 is a diagram showing an image example of resource disposition in time series of each subframe when Extended Cell DTX using Fake MBSFN subframes is applied.

As shown in the upper portion of FIG. 1, one frame has ten subframes. One subframe is, for example, 1 ms, and one frame is, for example, 10 ms. The subframes of the frame are identified with subframe numbers (subframes #0 to #9). In the discussion of 3GPP, as shown in FIG. 21, a CSI-RS is not transmitted with the subframes #0 and #5, and in FIG. 1, the lower left side represents a subframe of a block indicated by a left downward oblique line. When Extended Cell DTX is performed, in order to perform power saving using Fake MBSFN subframes, subframes which can act as the MBSFN subframes are used. At this time, the subframes #4 and #9 do not act as MBSFN subframes, and in FIG. 1, represent subframes of a horizontally striped block. Other subframes are subframes which can act as MBSFN subframes, and in FIG. 1, represent subframes of a sparsely dotted block. In the subframes which can act as MBSFN subframes, if the effect that MBSFN is used is notified, it should suffice that only the head CRS is transmitted. In this embodiment, a CSI-RS is disposed in subframes other than subframes capable of acting as MBSFN subframes, that is, the subframes #4 and #9 which cannot act as MBSFN subframes and can transmit a CSI-RS. In this case, a CSI-RS of a certain cell is transmitted, for example, in each frame, that is, at an interval of 10 ms. The transmission interval of a CSI-RS may be increased to 20 ms interval, 40 ms interval, or the like.

The lower side of FIG. 1 shows the configuration of the subframes #4 and #9, and is an image of resource disposition in time series of these subframes. The subframes #4 and #9 cannot act as MBSFN subframes, and for this reason, it is not possible to reduce CRS transmission using Fake MBSFN subframes. Accordingly, when four or more antenna ports are provided, as shown in the lower portion of FIG. 1, CRS transmission signals are in at least OFDM symbols #0, #1, #4, #7, #8, and #11 (symbols of a block indicated by a left downward oblique line). In this case, since the transmission signals are dispersed in the temporal direction, even if there were no transmission signals other than CRS, the amplifier (PA) is frequently turned ON/OFF, and the power saving effect is not high. In this way, in the subframes #4 and #9, since the power saving effect is not expected. For this reason, when transmitting a CSI-RS, signals which should be transmitted are transmitted with the subframes #4 and #9, and are not disposed in other subframes, thereby increasing the power saving effect as the entire system.

Figure 2:
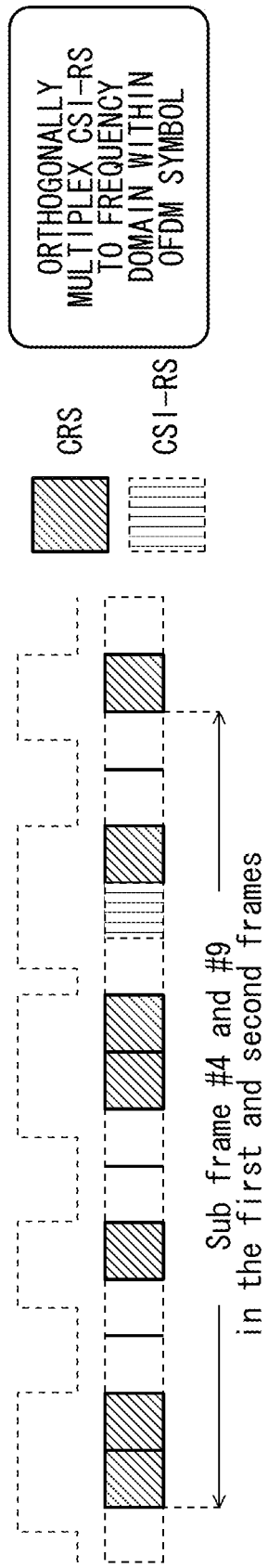
FIG. 2 is a diagram showing a first disposition example of a CSI-RS of a subframe in a first embodiment.
Figure 15:
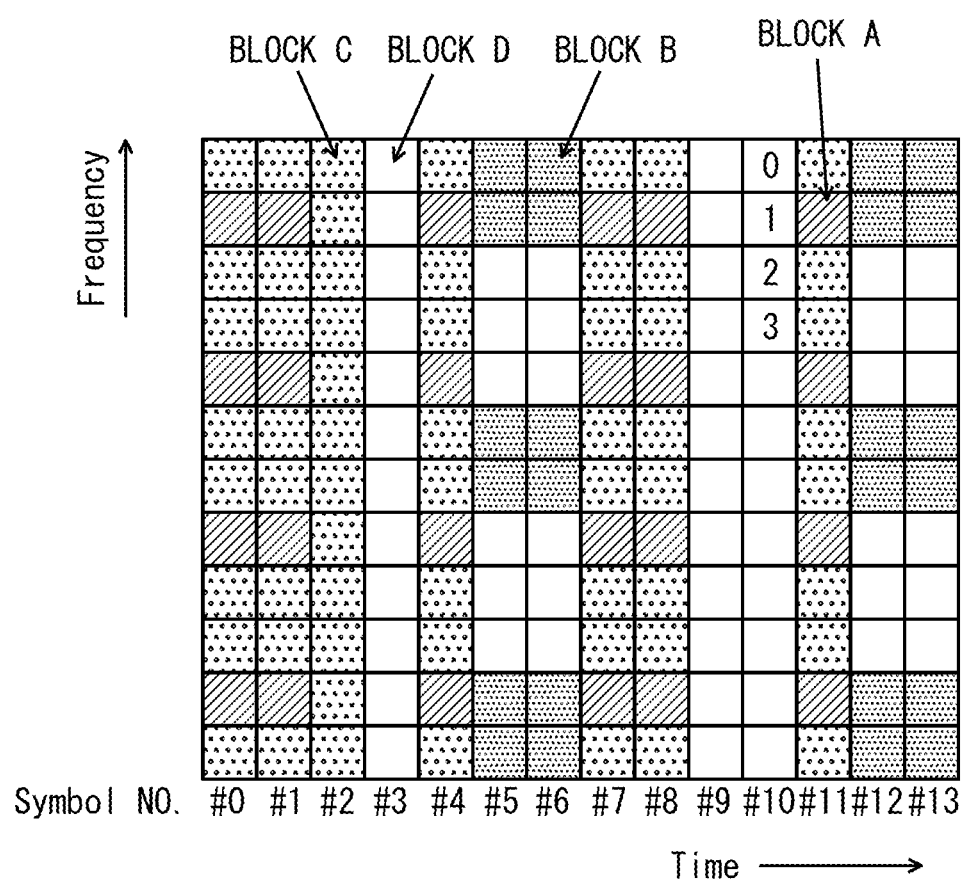
FIG. 15 is a diagram showing a pattern example of resource disposition when up to three cells can be multiplexed on four antenna ports.
Figure 16:
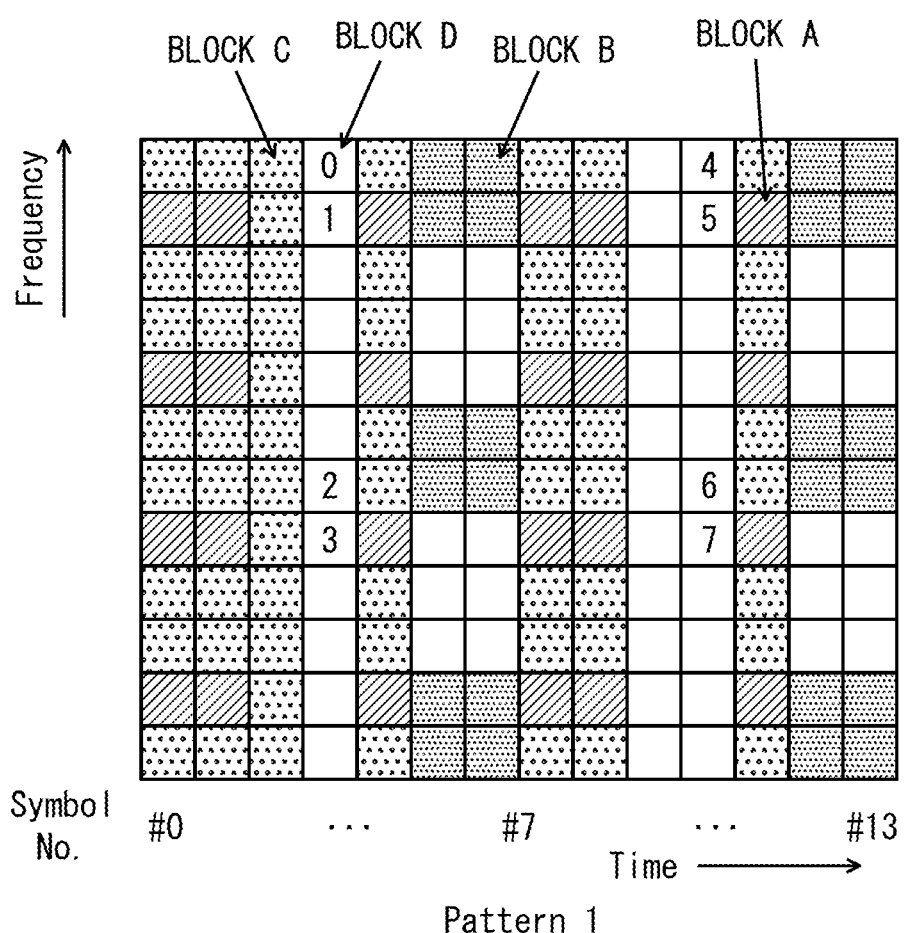
FIG. 16 is a diagram showing a pattern example (Pattern 1) of resource disposition when up to five cells can be multiplexed on eight antenna ports.
Figure 17:
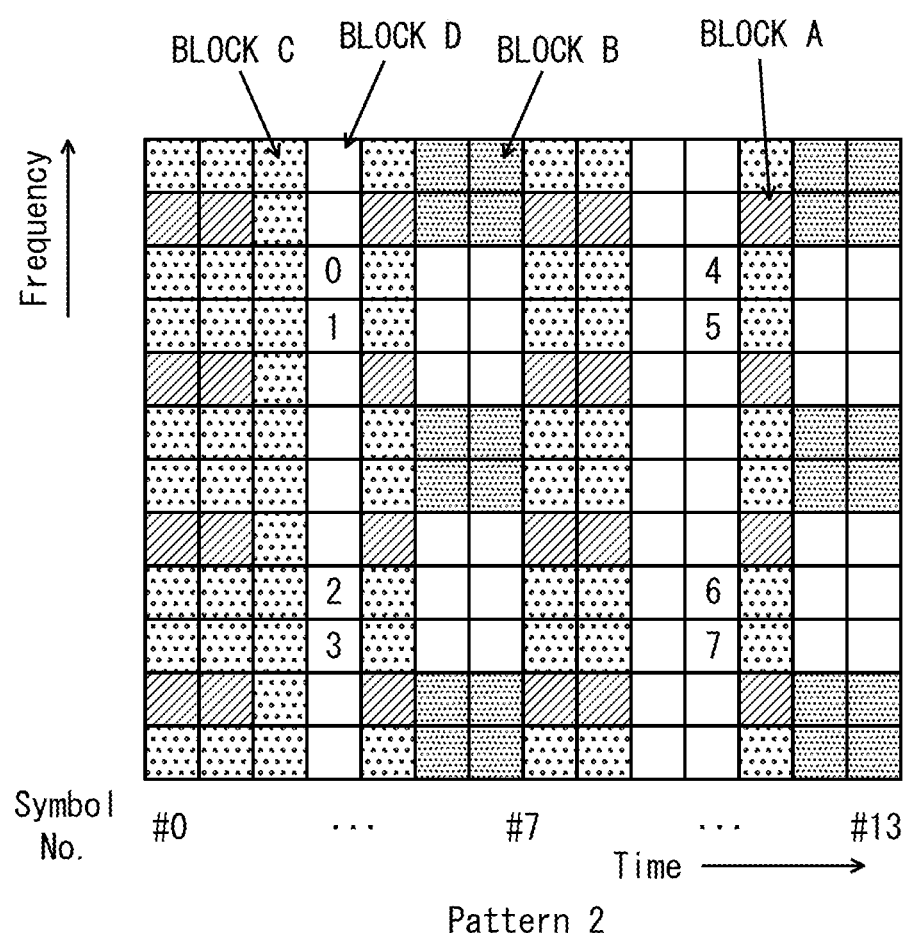
FIG. 17 is a diagram showing a pattern example (Pattern 2) of resource disposition when up to five cells can be multiplexed on eight antenna ports.
Figure 18:
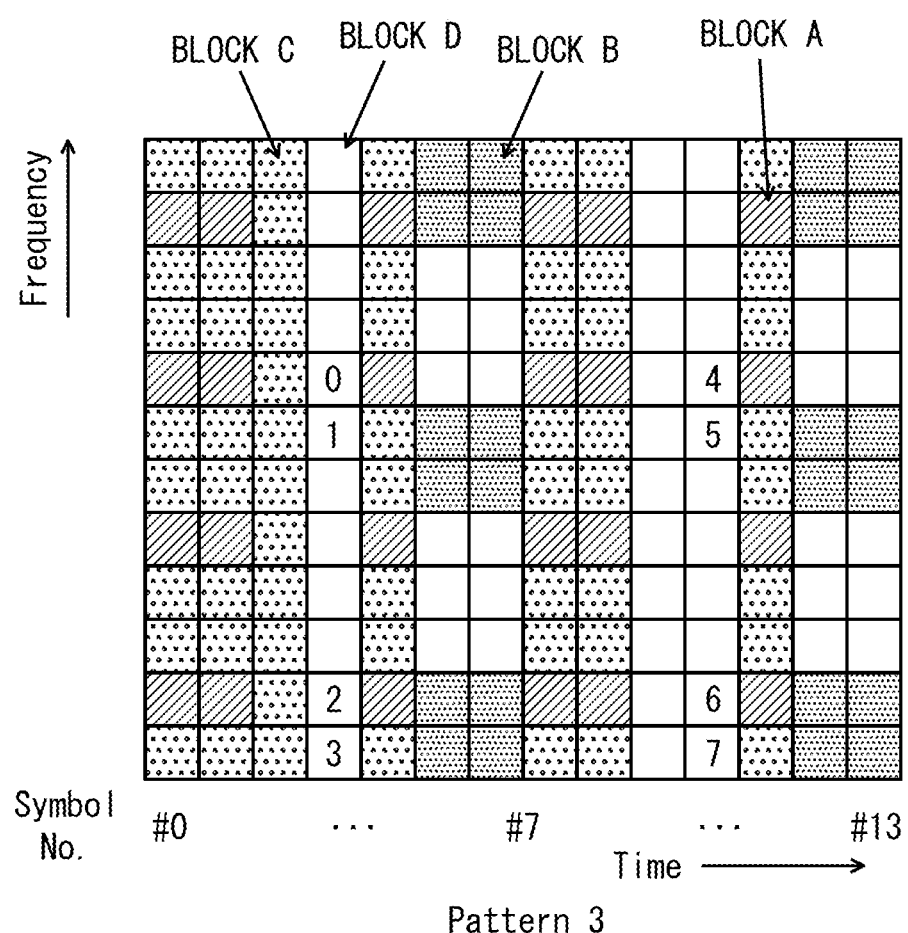
FIG. 18 is a diagram showing a pattern example (Pattern 3) of resource disposition when up to five cells can be multiplexed on eight antenna ports.
Figure 19:
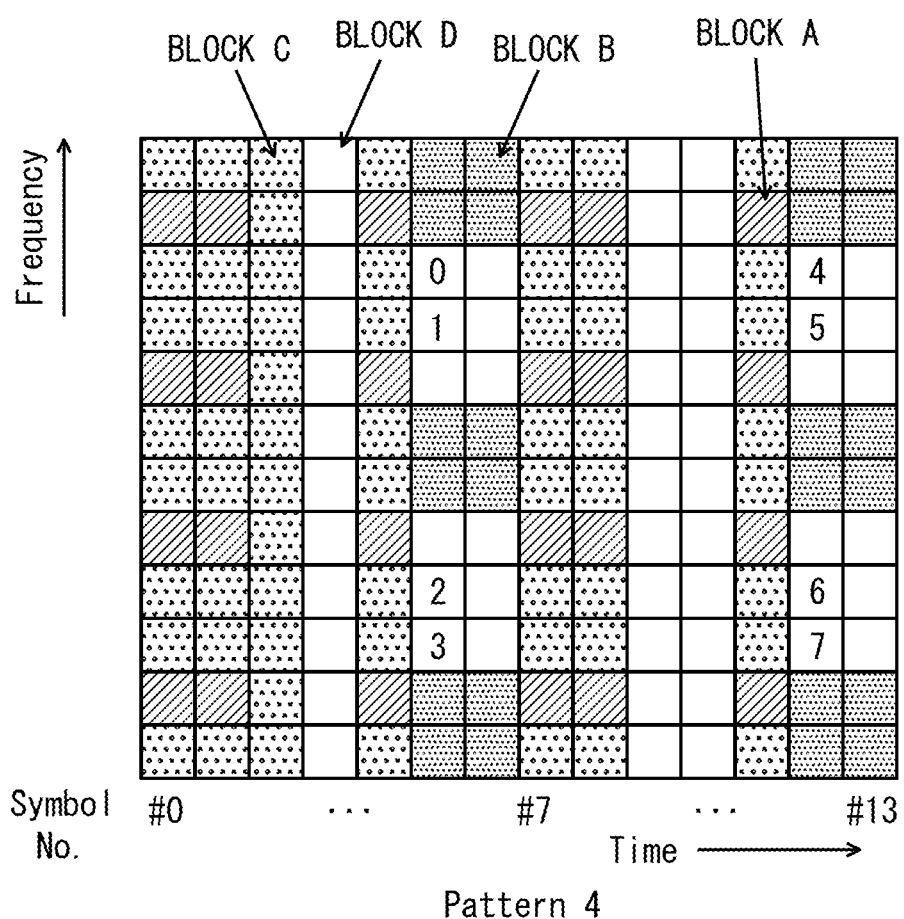
FIG. 19 is a diagram showing a pattern example (Pattern 4) of resource disposition when up to five cells can be multiplexed on eight antenna ports.
Figure 20:
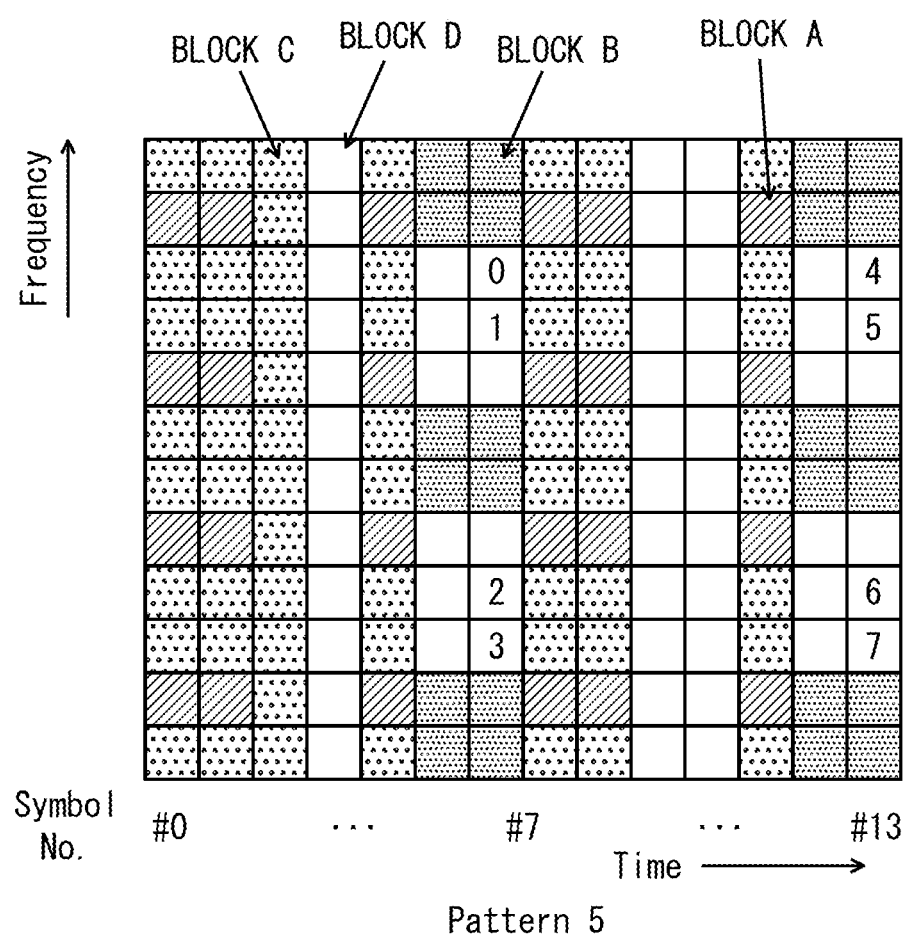
FIG. 20 is a diagram showing a pattern example (Pattern 5) of resource disposition when up to five cells can be multiplexed on eight antenna ports.

FIG. 2 is a diagram showing a first disposition example of a CSI-RS of a subframe in the first embodiment. The first disposition example of FIG. 2 shows an image of resource disposition of the subframes #4 and #9 when a CSI-RS is transmitted with the OFDM symbol #10. As described above, in the subframes #4 and #9, CRSs are transmitted with the OFDM symbols #0, #1, #4, #7, #8, and #11 (symbols of a block indicated by a left downward oblique line). In this case, as shown in FIG. 15, in the OFDM symbol #10 (a symbol of a block indicated by a vertical stripe), CSI-RSs of a plurality of antenna ports are orthogonally multiplexed with a frequency domain, and CSI-RSs which are transmitted from other base stations (cells) are transmitted using other REs (other subcarriers) of the same OFDM symbol #10.

Figure 3:
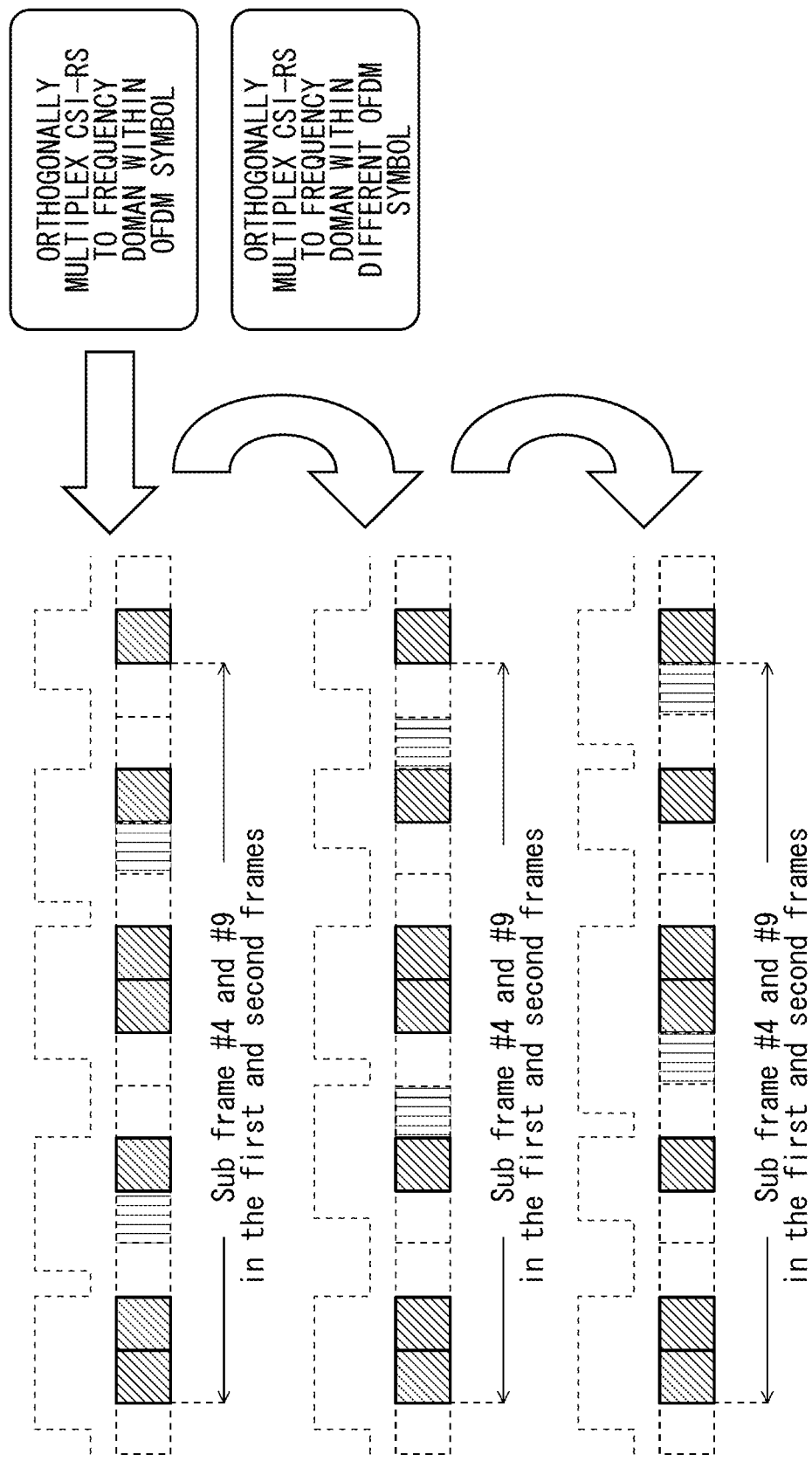
FIG. 3 is a diagram showing a second disposition example of a CSI-RS of a subframe in the first embodiment.

FIG. 3 is a diagram showing a second disposition example of a CSI-RS of a subframe in the first embodiment. The second disposition example of FIG. 3 shows an image of resource disposition of the subframes #4 and #9 when CSI-RSs are transmitted with the OFDM symbols {#3, #10}, {#5, #12}, {#6, #13}. In this case, as shown in FIGS. 16 to 20, in the OFDM symbols {#3, #10}, {#5, #12}, {#6, #13}, frequency domain multiplexing in the same OFDM symbol or time domain multiplexing by a different OFDM symbol is used to orthogonally multiplex CSI-RSs which are transmitted from a plurality of antenna ports or base stations (cells).

In this way, in the first embodiment, when a CSI-RS as an additional reference signal is transmitted so as to perform CoMP or the like, the CSI-RS is transmitted using subframes other than subframes capable of acting as MBSFN subframes when performing Extended Cell DTX using Fake MBSFN subframes, specifically, the subframes #4 and #9. Accordingly, when Extended Cell DTX is performed to achieve power saving, a CSI-RS can be transmitted while maintaining the power saving effect. Therefore, it is possible to achieve the power saving effect when a CSI-RS is transmitted from a base station to a terminal.

Hereinafter, as an example of the configuration of the wireless communication device in this embodiment, the configuration of a base station and a terminal (mobile station) will be described.

Configuration and Operation of Base Station

Figure 4:
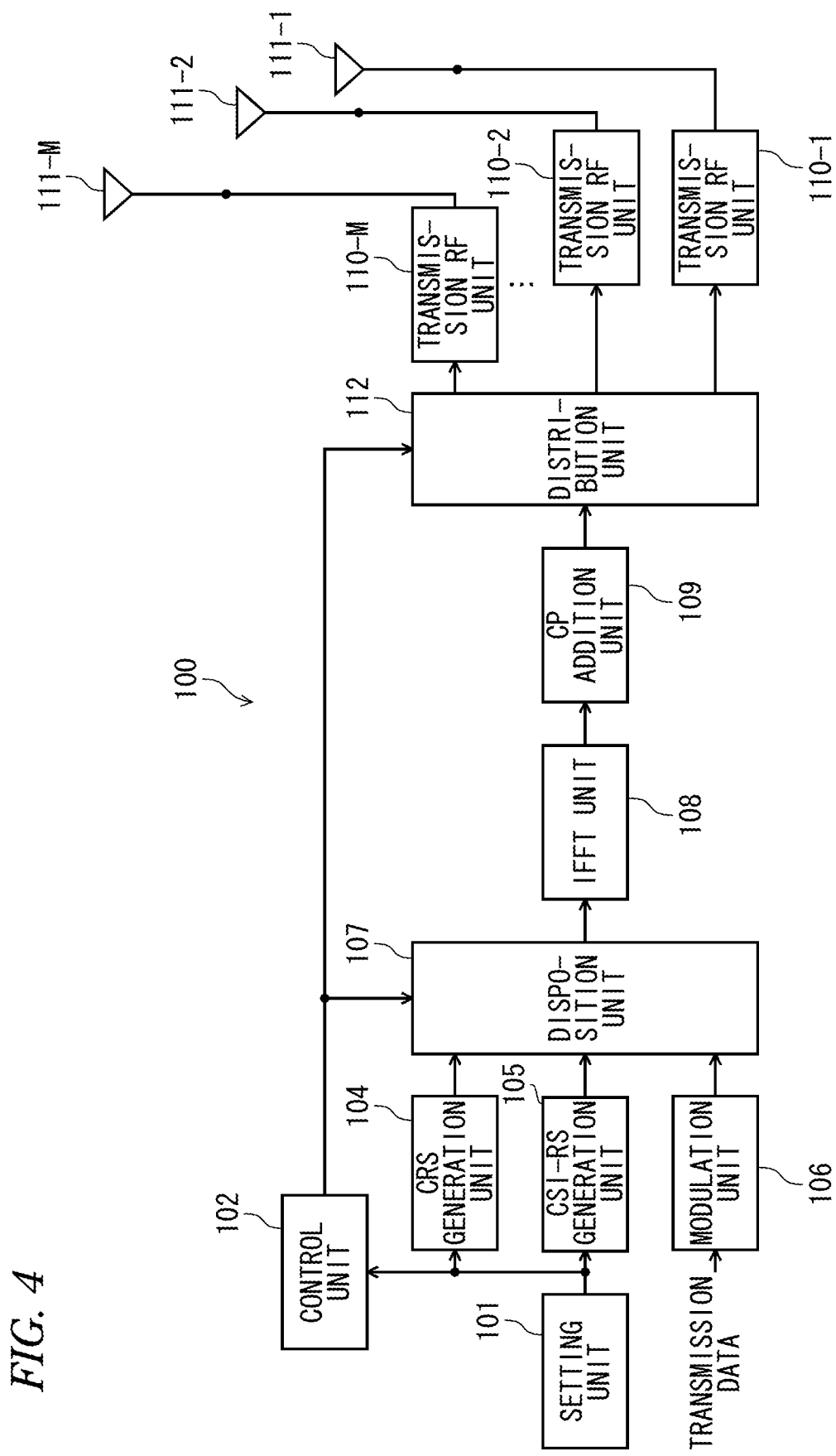
FIG. 4 is a block diagram showing the configuration of a base station in the first embodiment.

FIG. 4 is a block diagram showing the configuration of a base station 100 in the first embodiment. The base station (base station device) 100 includes a setting unit 101, a control unit 102, a CRS generation unit 104, a CSI-RS generation unit 105, a modulation unit 106, a disposition unit 107, an IFFT (Inverse Fast Fourier Transform) unit 108, a CP (Cyclic Prefix) addition unit 109, a distribution unit 112, a plurality (in this case, M) of transmission RF (Radio Frequency) units 110-1 to 110-M, and a plurality (in this case, M) of antennas 111-1 to 111-M.

The setting unit 101 sets (configures) the generation of a CRS, and when it is necessary to transmit a CSI-RS so as to support CoMP, and sets the generation of a CSI-RS. The setting unit 101 outputs these kinds of setting information to the control unit 102, the CRS generation unit 104, and the CSI-RS generation unit 105.

The control unit 102 controls resource disposition in the disposition unit 107 and the distribution of transmission signals in the distribution unit 112 on the basis of the setting information input from the setting unit 101. In order to notify a terminal in a host cell or a near cell of setting information including CSI-RS disposition information, the control unit 102 outputs the setting information to the disposition unit 107 to transmit the setting information as a control signal of an upper-level layer.

The CRS generation unit 104 generates a CRS on the basis of the setting information input from the setting unit 101. The CRS generation unit 104 outputs the generated CRS to the disposition unit 107.

The CSI-RS generation unit 105 realizes the function of a reference signal generation unit, and generates a CSI-RS on the basis of the setting information input from the setting unit 101. The CSI-RS generation unit 105 outputs the generated CSI-RS to the disposition unit 107.

The modulation unit 106 channel-encodes and modulates input transmission data (downlink data), and output a data signal after modulation to the disposition unit 107.

The disposition unit 107 multiplexes the CRS input from the CRS generation unit 104, the CSI-RS input from the CSI-RS generation unit 105, and the data signal (that is, PDSCH: Physical Downlink Shared CHannel) input from the modulation unit 106. When there is a control signal of an upper-level layer for giving notification of the setting information from the control unit 102, the disposition unit 107 disposes information of the control signal in the data signal (PDSCH). Here, disposition unit 107 disposes (multiplexes) the CRS, the CSI-RS, and the data signal (PDSCH) in the respective resource blocks of the downlink. At this time, the disposition unit 107 multiplexes the CSI-RS such that the CSI-RS is disposed in the subframe #4 or #9. In regard to the disposition of the CSI-RS or the like in the disposition unit 107, for example, the disposition example shown in FIG. 2 or 3 is considered. The disposition unit 107 outputs the multiplexed signal to the IFFT unit 108.

The IFFT unit 108 performs IFFT processing on the signal input from the disposition unit 107, and acquires a time domain signal. The IFFT unit 108 outputs the time domain signal to the CP addition unit 109.

The CP addition unit 109 adds a CP to the time domain signal input from the IFFT unit 108, and outputs the signal after CP addition to the distribution unit 112. The distribution unit 112 outputs the corresponding signals to the transmission RF units 110-1 to 110-M under the control of the control unit 102. The signals for all of M transmission antennas are input to the distribution unit 112, and are correspondingly distributed to the antennas.

The transmission RF units 110-1 to 110-M perform transmission processing, such as D/A (Digital to Analog) conversion, up-convert, and amplification, on the signals input from the distribution unit 112, and transmit and output the signals subjected to the transmission processing from the antennas 111-1 to 111-M as transmission radio signals (in this case, OFDM signals). The transmission radio signals are transmitted to the terminal in a wireless manner. Here, the transmission RF units 110-1 to 110-M and the antennas 111-1 to 111-M realize the function of a transmission unit.

Configuration and Operation of Terminal (Mobile Station)

Figure 5:
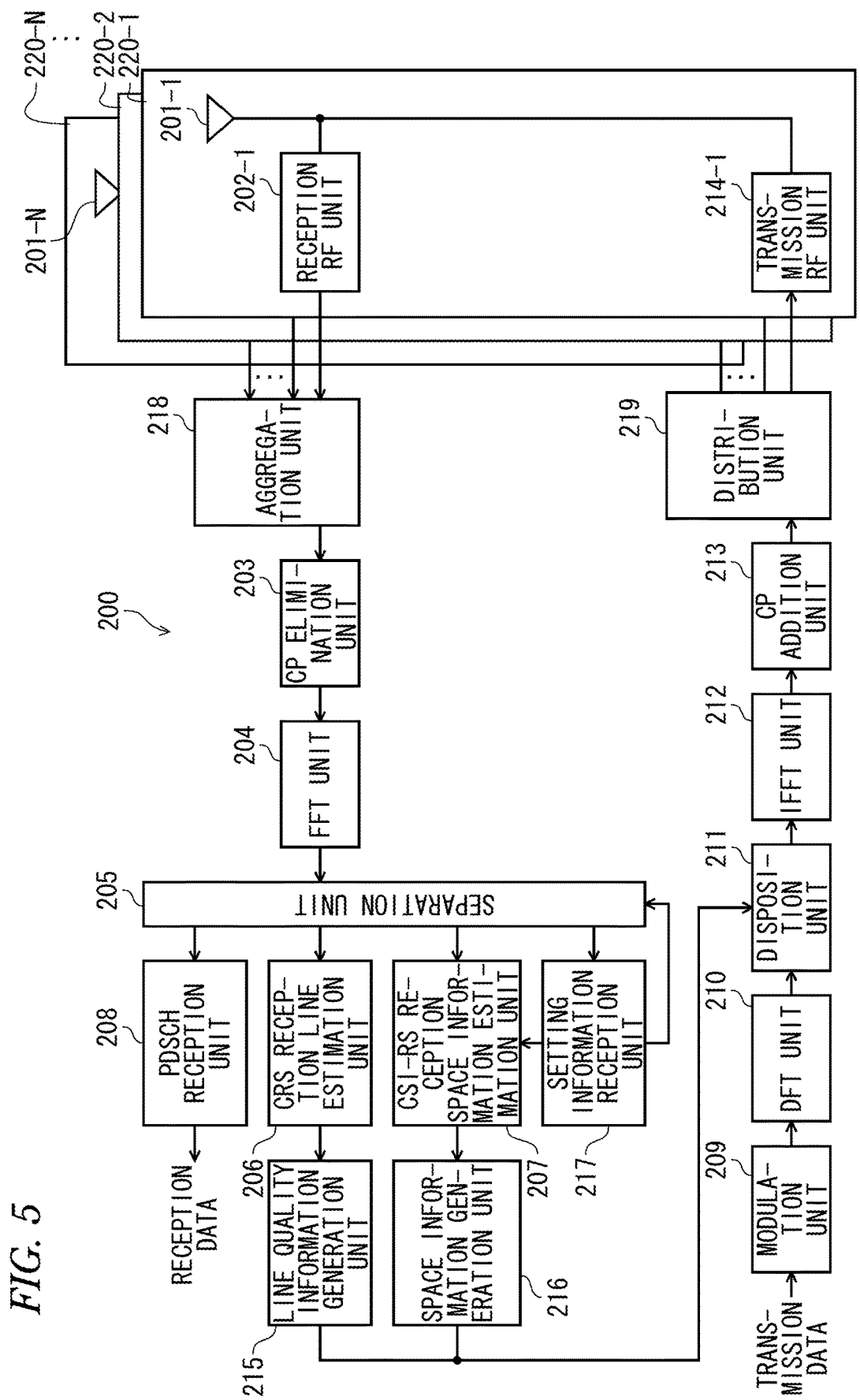
FIG. 5 is a block diagram showing the configuration of a terminal in the first embodiment.

FIG. 5 is a block diagram showing the configuration of a terminal 200 in the first embodiment. The terminal (mobile station device) 200 includes a plurality (in this case, N) of antennas 201-1 to 201-N, a plurality (in this case, N) of reception RFs units 202-1 to 202-N, an aggregation unit 218, a CP elimination unit 203, an FFT (Fast Fourier Transform) unit 204, a separation unit 205, a CRS reception line estimation unit 206, a CSI-RS reception space information estimation unit 207, a PDSCH reception unit 208, a line quality information generation unit 215, a space information generation unit 216, a setting information reception unit 217, a modulation unit 209, a DFT (Discrete Fourier Transform) unit 210, a disposition unit 211, an IFFT unit 212, a CP addition unit 213, a distribution unit 219, and a plurality (in this case, N) of transmission RF units 214-1 to 214-N. Here, an antenna, a transmission RF unit, and a reception RF unit are collectively called an RF block. As in the illustrated example, when the number of antennas is N, the terminal 200 has N RF blocks 220-1 to 220-N. These RF blocks 220-1 to 220-N realize the function of a reception unit.

The reception RF units 202-1 to 202-N are configured such that the reception band is changeable, and changes the reception band in accordance with a reception signal. The reception RF units 202-1 to 202-N perform reception radio processing (down-convert, A/D (Analog to Digital) conversion, and the like) on the reception radio signals (in this case, OFDM signals) received through the antennas 201-1 to 201-N, and output the obtained reception signals to the aggregation unit 218. The aggregation unit 218 aggregates the reception signals input from the RF blocks 202-1 to 202-N, and outputs the reception signals to the CP elimination unit 203.

The CP elimination unit 203 eliminates the CP from the reception signals input from the reception RF units 202-1 to 202-N of the RF blocks 202-1 to 202-N, and outputs the signals after CP elimination to the FFT unit 204.

The FFT unit 204 performs FFT processing on each signal input from the CP elimination unit 203 to acquire a frequency domain signal. The FFT unit 204 outputs the frequency domain signal to the separation unit 205.

The separation unit 205 separates the frequency domain signal input from the FFT unit 204 into the CRS, the CSI-RS, and the data signal (that is, PDSCH). The separation unit 205 outputs the CRS to the CRS reception line estimation unit 206, outputs the CSI-RS to the CSI-RS reception space information estimation unit 207, and outputs the PDSCH to the PDSCH reception unit 208 on the basis of setting information received with previous subframes. The separation unit 205 acquires the control signal of the upper-level layer including the setting information, and outputs the control signal to the setting information reception unit 217.

The setting information reception unit 217 reads the setting information including the CSI-RS disposition information from the control signal input from the separation unit 205, and outputs the setting information to the separation unit 205. The separation unit 205 separates and extracts a CSI-RS disposed in a predetermined subframe on the basis of the CSI-RS disposition information in the setting information. The setting information reception unit 217 outputs the setting information, such as a back-diffusion code for receiving and demodulating a CSI-RS, to the CSI-RS reception space information estimation unit 207.

The CRS reception line estimation unit 206 estimates the downlink transmitted from the base state to the mobile station device itself by the CRS input from the separation unit 205, and outputs the line estimation value of the downlink to the line quality information generation unit 215. The line quality information generation unit 215 generates line quality information to be reported to the base station on the basis of the line estimation value input from the CRS reception line estimation unit 206. The line quality information to be generated is, for example, a CQI (Channel Quality Indicator) or the like.

The CSI-RS reception space information estimation unit 207 realizes the function of a space estimation unit, and performs space information estimation of the downlink transmitted from the base station to the mobile station device itself by the CSI-RS input from the separation unit 205 using the setting information of the CSI-RS input from the setting information reception unit 217. The CSI-RS reception space information estimation unit 207 inputs the space estimation information of the downlink to the space information generation unit 216. The space information generation unit 216 generates space information to be reported to the base station on the basis of the space estimation information input from the CSI-RS reception space information estimation unit 207. The space information estimation is performed on another peripheral base station as a subject for CoMP as well as a base station with which the mobile station device itself performs communication.

The PDSCH reception unit 208 demodulates and channel-decodes the PDSCH input from the separation unit 205, and acquires reception data.

The modulation unit 209 channel-encodes and modulates input transmission data (uplink data), and outputs the data signal after modulation to the DFT unit 210.

The DFT unit 210 performs DFT processing on the data signal input from the modulation unit 209 to acquire a frequency domain signal. The DFT unit 210 outputs the frequency domain signal to the disposition unit 211.

The disposition unit 211 disposes the line quality information input from the line quality information generation unit 215, the space information input from the space information generation unit 216, and the frequency domain signal input from the DFT unit 210 in the resource blocks of the uplink.

The IFFT unit 212 performs IFFT processing on the frequency domain signal input from the disposition unit 211, and acquires a time domain signal. The IFFT unit 212 outputs the time domain signal to the CP addition unit 213.

The CP addition unit 213 adds a CP to the time domain signal input from the IFFT unit 212, and outputs the signal after CP addition to the distribution unit 219. The distribution unit 219 outputs the corresponding signals to the transmission RF units 214-1 to 214-N of the RF blocks 220-1 to 220-N. The signals for all of N transmission antennas are input to the distribution unit 219, and are correspondingly distributed to the antennas.

The transmission RF units 214-1 to 214-N perform transmission processing, such as D/A (Digital to Analog) conversion, up-convert, and amplification, on the signals input from the distribution unit 219, and transmit and output the signals subjected to the transmission processing from the antennas 201-1 to 201-N as transmission radio signals. The transmission radio signals are transmitted to the base station in a wireless manner.

According to the first embodiment, in the base station, if a CSI-RS is transmitted with subframes other than subframes capable of acting as MBSFN subframes when Extended Cell DTX is performed, it is possible to transmit a CSI-RS without causing damage to the power saving effect using Fake MBSFN subframes. At this time, only if the effect that MBSFN is used is notified from the base station to the terminal, the terminal which can address MBSFN can identify MBSFN subframes and other subframes, and can appropriately receive a CSI-RS. In the terminal, space information estimation of the downlink is performed on the basis of the received CSI-RS, and space information which is reported to a currently communicating base station and a peripheral base station as a subject for CoMP can be generated.

Second Embodiment

A second embodiment is a second example of disposition of a CSI-RS as an additional reference signal. In the second embodiment, in order to secure the number of multiplexes of a CSI-RS, at the normal time when Extended Cell DTX is not performed, a CSI-RS is transmitted with subframes capable of acting as MBSFN subframes, and when Extended Cell DTX is performed, a CSI-RS is transmitted with subframes incapable of acting as MBSFN subframes. At this time, when focusing on that interference when orthogonality of the CSI-RS is collapsed becomes small with an increasing distance, CSI-RSs of a plurality of cells are multiplexed in accordance with the distance between the cells taking into consideration the disposition of the cells.

If the subframes which transmit a CSI-RS are limited to the subframes #4 and #9, the number of CSI-RSs which can be multiplexed becomes small while keeping orthogonality between the cells. When Extended Cell DTX using Fake MBSFN subframes is not performed, CSI-RSs for five cells in each subframe can be multiplexed, and thus CSI-RSs for 5 cells×8 subframes=40 cells can be multiplexed in the subframes other than the subframes #0 and #5 while keeping orthogonality. However, if only the subframes #4 and #9 are used, only CSI-RSs for 5 cells×2 subframes=10 cells can be multiplexed. A CSI-RS is used for CoMP line estimation (space information estimation), and in order that line estimation is performed in a terminal of another cell, it is necessary to keep orthogonality between close cells, in particular, between adjacent cells.

In order to respond to the above-described problem, in the second embodiment, at the normal time, a CSI-RS is orthogonally multiplexed using a different RE in the same subframes between close cells, and a CSI-RS is multiplexed with different subframes between other separate cells. That is, at the normal time, a CSI-RS is transmitted using subframes capable of acting as MBSFN subframes along with the subframes #4 and #9. When Extended Cell DTX is performed, a CSI-RS is changed from subframes (subframes #1, #2, #3, #6, #7, and #8) capable of acting as MBSFN subframes to other subframes (subframe #4 or #9) and mapped while keeping orthogonality in the subframes. In regard to the change of the disposition of a CSI-RS from subframes capable of acting as MBSFN subframes to other subframes, the disposition of a CSI-RS of each subframe and the change timing may be appropriately set in accordance with the disposition of the cells.

Figure 6:
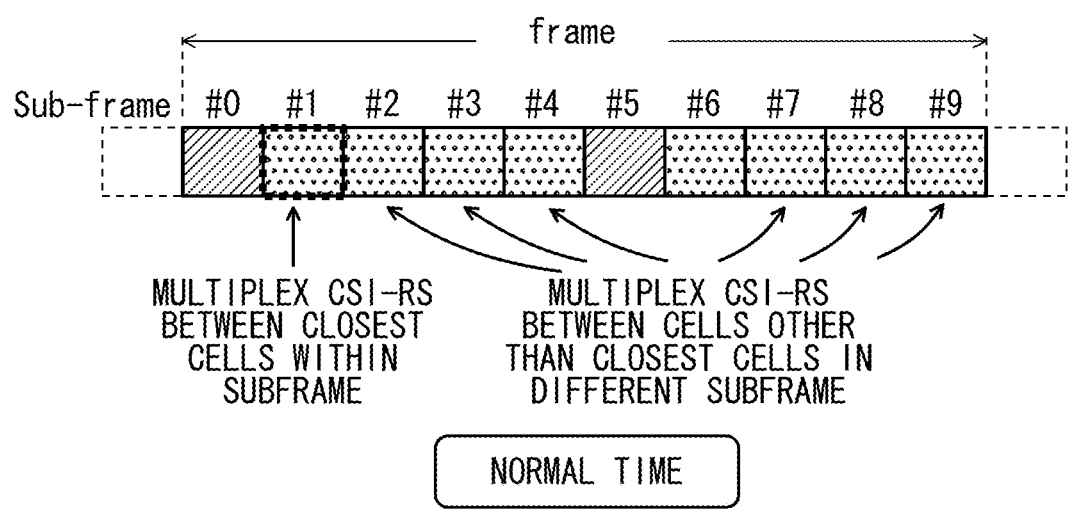
FIG. 6 is a diagram showing a disposition example of a subframe which transmits a CSI-RS of a frame at a normal time in a second embodiment.

FIG. 6 is a diagram showing a disposition example of subframes which transmit a CSI-RS in a frame at a normal time in the second embodiment. At the normal time, that is, when Extended Cell DTX to which Fake MBSFN subframes are applied is not performed, it is assumed that CSI-RSs between close cells, in particular, between the closes (adjacent) cells are orthogonally multiplexed with the same subframes, and CSI-RSs between other cells are multiplexed with different subframes. In the illustrated example, CSI-RSs between the nearest cells are multiplexed in the same subframes, such as the subframe #1, and CSI-RSs between other separate cells are multiplexed in other subframes, such as the subframes #1, #2, #3, and #4. Here, cells in which multiplexing is performed in the same subframes are called a CSI-RS group. Basically, if CSI-RSs between the nearest cells are multiplexed with the same subframes, while there are not other restrictions, CSI-RSs may be multiplexed with subframes separated in time with an increasing distance between the cells.

Figure 7:
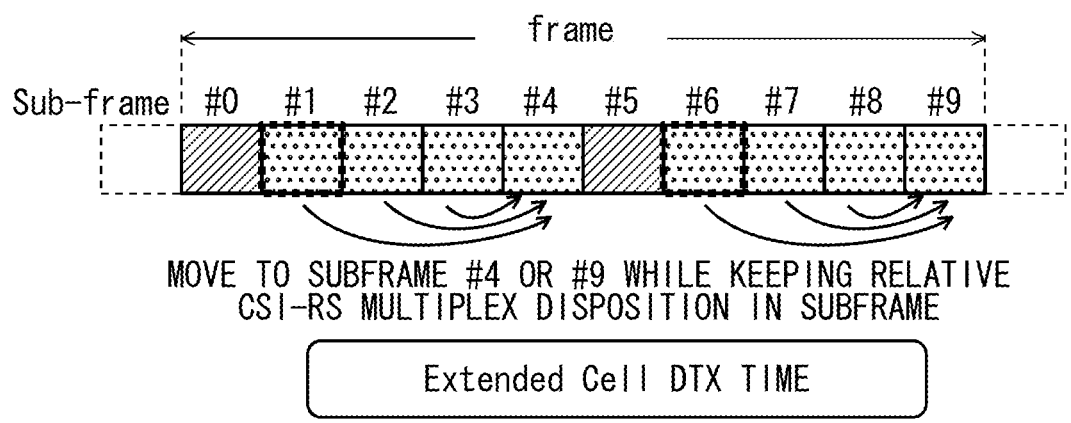
FIG. 7 is a diagram showing a disposition example of a subframe which transmits a CSI-RS of a frame during the execution of Extended Cell DTX in the second embodiment.

FIG. 7 is a diagram showing a disposition example of subframes which transmit a CSI-RS in a frame during the execution of Extended Cell DTX in the second embodiment. When Fake MBSFN subframes are applied and an Extended Cell DTX mode is executed, CSI-RSs which are transmitted with subframes acting as Fake MBSFN subframe are changed to subframes incapable of acting as MBSFN subframes, that is, the subframe #4 or #9 and mapped while keeping orthogonality between the CSI-RSs in the subframes (while keeping relative CSI-RS multiplex-disposition in the subframes). That is, the subframe to which the CSI-RS group is allocated is changed to the subframe #4 or #9 while keeping orthogonality in the CSI-RS group.

When mapping to the subframe #4 or #9, if orthogonality between CSI-RSs in the subframes is kept, other restrictions are not required; however, the simplest case is a method in which mapping is made while keeping a resource disposition pattern in the same subframe. While there is no problem if mapping is made in either the subframe #4 or #9, it is easy to map the subframes (subframes #1 to #3) of the first half of the frame to the subframe #4, and to map the subframes (subframes #6 to #8) of the second half of the frame to the subframe #9. In this case, the base station notifies only the subframe number which is changed to the MBSFN subframe, and the terminal which receives a CSI-RS with this subframe can receive the CSI-RS simply with the same RE of the subframe #4 if the CSI-RS is originally received with the first half of the frame, and can receive the CSI-RS simply with the same RE of the subframe #9 if the CSI-RS is originally received with the second half of the frame.

The subframe number which is changed to the MBSFN subframe is notified with MBSFN-SubframeConfig included in SIB2 (System Information Block Type2) of RRC (Radio Resource Control) information elements as the control signal of the upper-level layer. In MBSFN-SubframeConfig, a subframe which acts as an MBSFN subframe is notified as subframeAllocation (see reference NPL 1 described below).

In subframeAllocation, there are oneFrame for one frame and fourFrames for four frames, and either one is used. In the case of oneFrame, whether six subframes which can be applied to MBSFN subframes in one frame are set as MBSFN subframes or normal non-MBSFN subframes is notified in one subframe unit. In the case of fourFrames, for 24 subframes which can be applied to MBSFN subframes in four subframes, notification is given in one subframe unit. As radioframeAllocationPeriod, a frame interval at which an MBSFN subframe is transmitted is set. The radioframeAllocationPeriod includes n1, n2, n4, n8, n16, and n32. For example, if n1 is used, the radioframeAllocationPeriod becomes a one-frame interval, and if n2 is used, the radioframeAllocationPeriod becomes a two-frame interval. However, the use of n1 and n2 of the radioframeAllocationPeriod is limited to when subframeAllocation is oneFrame, n4 or more is used for fourFrames.

Accordingly, for example, when the subframe #1 is changed to the Extended Cell DTX mode to which Fake MBSFN subframes are applied, after oneFrame is used with subframeAllocation of MBSFN-SubframeConfig, the subframe #1 is set as an MBSFN subframe, and the radioframeAllocationPeriod is set to n1.

[Reference NPL 1] 3GPP TS 36.331 V9.2.0 (2010-03), "3rd Generation Partnership Project; Technical Specification Group Radio Access Network; Evolved Universal Terrestrial Radio Access (E-UTRA); Radio Resource Control (RRC); Protocol specification (Release 9)"

Configuration and Operation of Base Station

Figure 8:
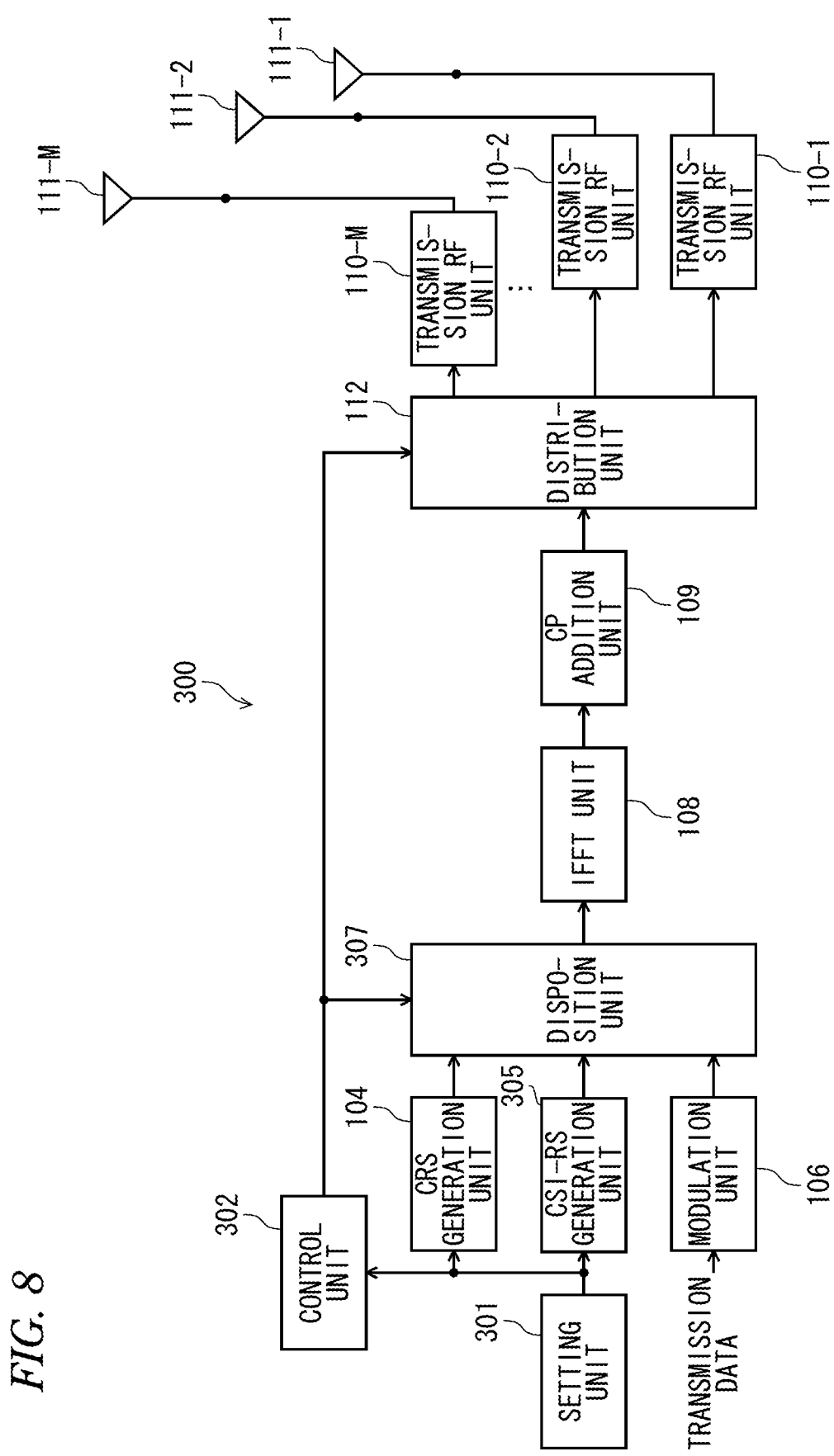
FIG. 8 is a block diagram showing the configuration of a base station in the second embodiment.

FIG. 8 is a block diagram showing the configuration of a base station 300 in the second embodiment. The base station 300 is different from the base station 100 of the first embodiment shown in FIG. 4 in that the operations of a setting unit 301, a control unit 302, a CSI-RS generation unit 305, and a disposition unit 307 are different. Other parts are the same as those in the first embodiment, and description thereof will not be repeated.

The operation of the characteristic base station 300 in the second embodiment will be described. The setting unit 301 outputs setting information including CSI-RS disposition information at the normal time (normal mode) and during the execution of Extended Cell DTX (Extended Cell DTX mode). The control unit 302 performs operation control relating to CSI-RS transmission in each mode on the basis of the setting information from the setting unit 301. When changing from the normal mode to the Extended Cell DTX mode, the control unit 302 outputs control information for reporting subframe numbers acting as MBSFN subframes to the disposition unit 307, transmits only a subframe number to be changed to an MBSFN subframe as the control signal of the upper-level layer, and gives notification to the terminal.

The CSI-RS generation unit 305 generates a CSI-RS at the normal time and during the execution of Extended Cell DTX on the basis of the setting information input from the setting unit 301. At the normal time, the disposition unit 307 orthogonally multiplexes CSI-RSs between the nearest cells in the same subframes from the subframes #1, #2, #3, #4, #6, #7, #8, and #9, and multiplexes CSI-RSs between other separate cells with different subframes. During the execution of Extended Cell DTX, for a subframe which is changed to an MBSFN subframe, the disposition unit 307 changes a CSI-RS from among CSI-RSs multiplexed in the subframes #1, #2, #3, #6, #7, and #8 to the subframe #4 or #9 and multiplexes the CSI-RS while keeping relative CSI-RS multiplex-disposition in the subframe.

Configuration and Operation of Terminal (Mobile Station)

Figure 9:
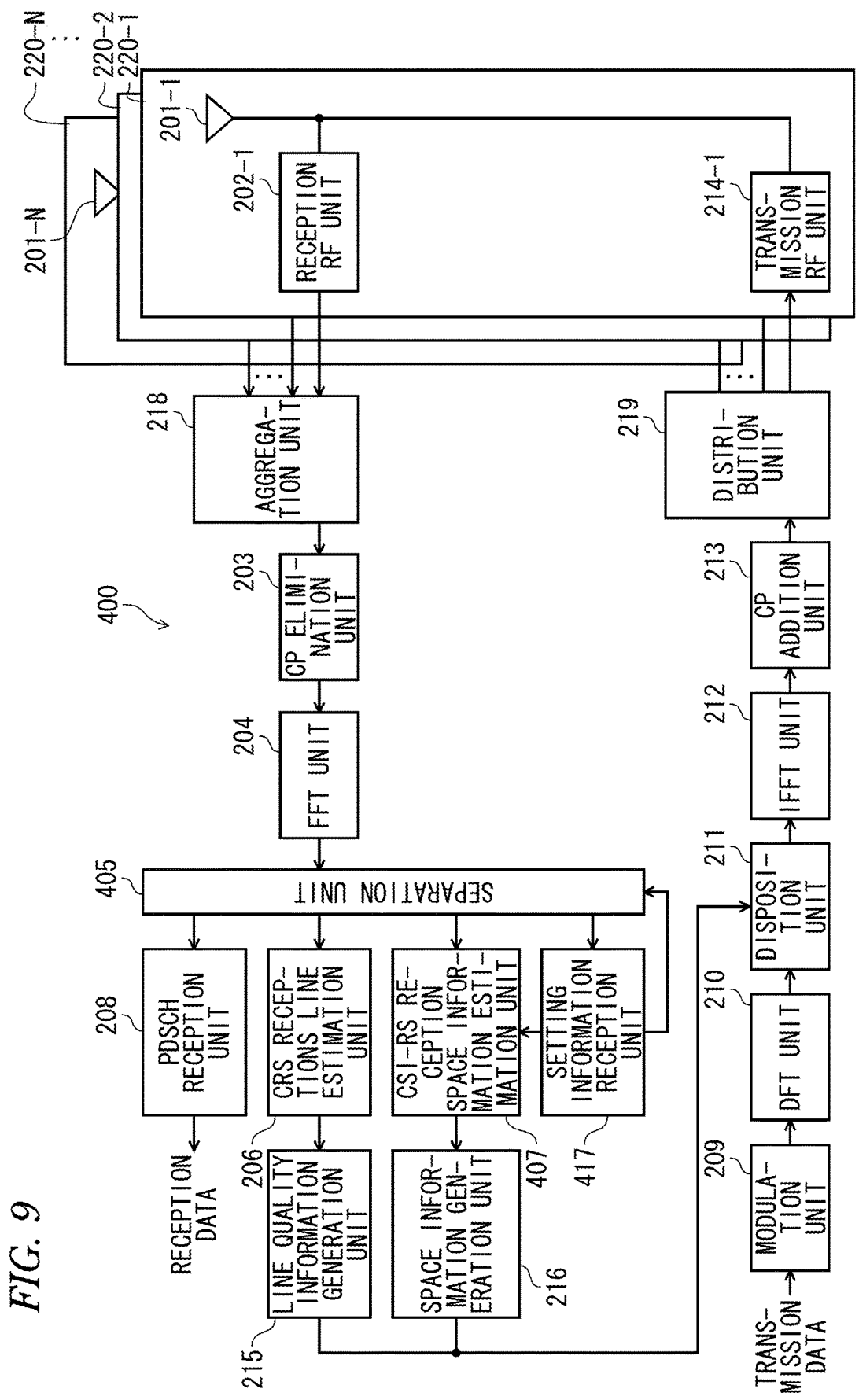
FIG. 9 is a block diagram showing the configuration of a terminal in the second embodiment.

FIG. 9 is a block diagram showing the configuration of a terminal 400 in the second embodiment. The terminal 400 is different from the terminal 200 of the first embodiment shown in FIG. 5 in that the operations of a separation unit 405, a CSI-RS reception space information estimation unit 407, and a setting information reception unit 417 are different. Other parts are the same as those in the first embodiment, and description will not be repeated.

The operation of the characteristic terminal 400 in the second embodiment will be described. The separation unit 405 acquires the control signal of the upper-level layer including the setting information from the signal input from the FFT unit 204, and outputs the control signal to the setting information reception unit 417. The setting information reception unit 417 reads the setting information including the CSI-RS disposition information from the control signal input from the separation unit 405, and outputs the setting information to the separation unit 405. The setting information reception unit 417 outputs the setting information, such as a back-diffusion code for receiving and demodulating a CSI-RS, to the CSI-RS reception space information estimation unit 407.

The separation unit 405 separates the frequency domain signal input from the FFT unit 204 on the basis of the setting information received with the previous subframes, acquires the CSI-RS, and outputs the CSI-RS to the CSI-RS reception space information estimation unit 407. At this time, at the normal time and during the execution of Extended Cell DTX, the separation unit 405 acquires the CSI-RS in accordance with mapping of the CSI-RS to each subframe by the base station, and outputs the CSI-RS to the CSI-RS reception space information estimation unit 407.

At the normal time and during the execution of the Extended Cell DTX, the CSI-RS reception space information estimation unit 407 performs space information estimation of the downlink transmitted from the base station to the mobile station device itself by the CSI-RS input from the separation unit 405 using the setting information of the CSI-RS input from the setting information reception unit 417.

Figure 10:
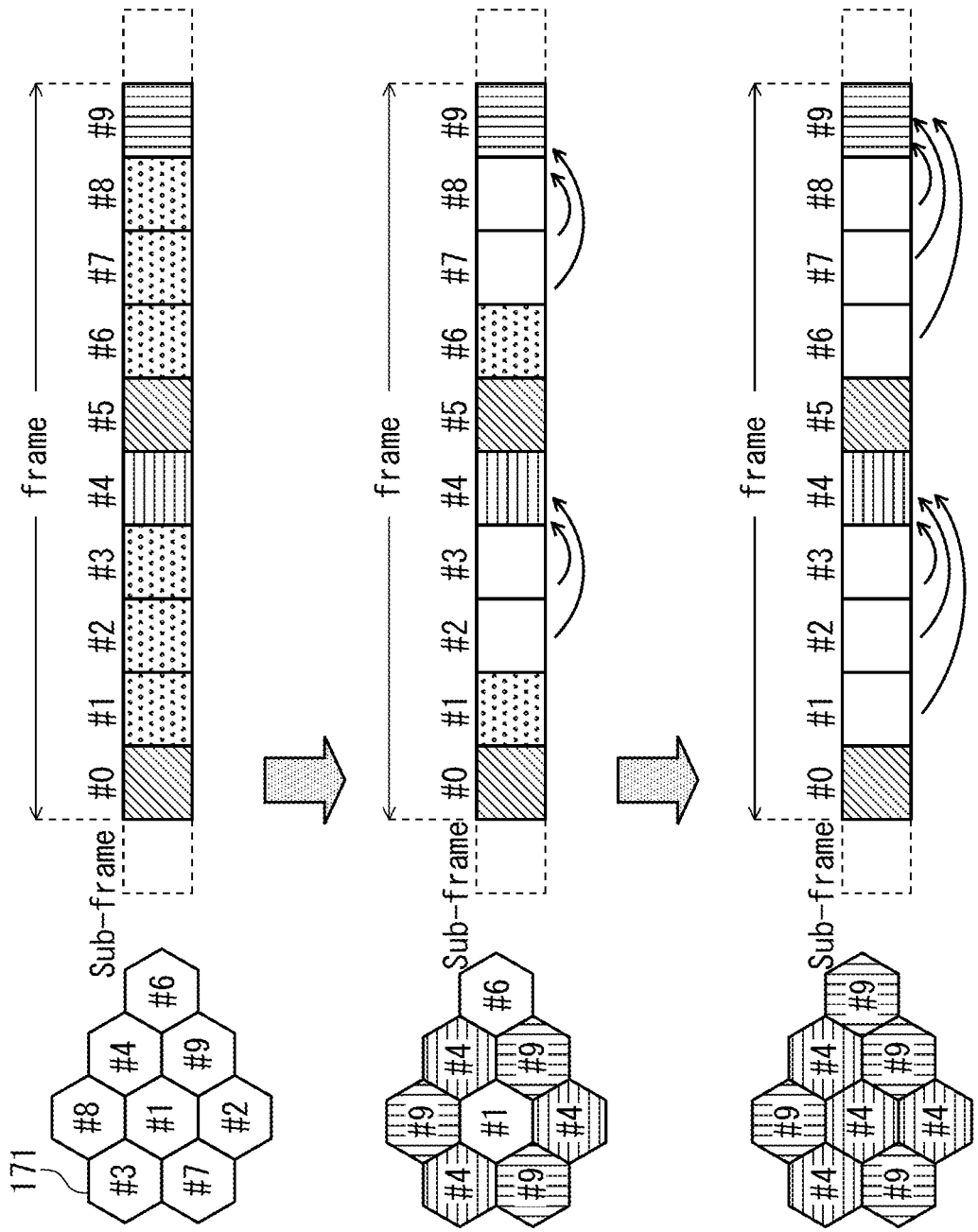
FIG. 10 is a diagram showing the transition of the disposition of a CSI-RS to each subframe when changing from the normal time to the execution of Extended Cell DTX.

FIG. 10 is a diagram showing a transition example of the disposition of a CSI-RS to each subframe when changing from the normal time to the execution of Extended Cell DTX. In FIG. 10, in a situation in which a frame transmitting a CSI-RS in the normal mode is gradually changed to the Extended Cell DTX mode using Fake MBSFN subframes, the correspondence of the subframe at that time and the cell disposition is shown collectively. In the drawing, it is assumed that one macro cell 171 indicated by a hexagon has a plurality of sector cells constituted by one eNB or about five individual cells of small transmission power cells, such as RRH (Remote Radio Head), and the CSI-RSs of the cells in one macro cell 171 are orthogonally multiplexed in the same subframe. Accordingly, about five CSI-RSs are multiplexed in one subframe. In FIG. 10, the number (#1 or the like) described in the macro cell 171 represents which subframe in the frame is used when transmitting a CSI-RS.

At the normal time shown on the upper side of FIG. 10, since the CSI-RSs of different macro cells 171 are transmitted with different subframes, the CSI-RSs are orthogonalized. When changing to the Extended Cell DTX mode, it is preferable that, in case of moving a CSI-RS to the subframes #4 and #9, CSI-RSs which are multiplexed in the same subframe do not become CSI-RSs between adjacent macro cells 171. For this reason, at the beginning of the change to the Extended Cell DTX mode shown in the middle of FIG. 10, the CSI-RSs of the subframes #2 and #3, and #7 and #8 are preferentially changed to the subframes #4 and #9. In this case, even if four subframes are put in the Extended Cell DTX mode using Fake MBSFN subframes, CSI-RSs between adjacent macro cells 171 can be multiplexed with different subframes. In this way, it is possible to suppress the amount of increase in interference between CSI-RSs to be small. The total number of multiplexes of the CSI-RS is maintained with no change compared to the normal time.

As shown on the lower side of FIG. 10, when the change to the Extended Cell DTX mode proceeds, the CSI-RSs of the subframes #1 and #6 are changed to the subframes #4 and #9 and mapped. In this case, orthogonality of the CSI-RS in each macro cell 171 is kept, and when the Extended Cell DTX mode proceeds to the maximum (the ratio of discontinuous communication increases), since it is assumed that the number of terminals is small, it is considered that interference between CSI-RSs does not cause a large problem.

According to the second embodiment, if orthogonality of the CSI-RS between cells is sacrificed while maintaining orthogonality of the CSI-RS in the same cell, it is possible to secure the number of multiplexes of the CSI-RS in a plurality of cells, and to keep orthogonality of the CSI-RS between the nearest cells which cause large interference to other cells. At this time, while the CSI-RSs between cells other than the nearest cells may not keep orthogonality, since these cells are cells at a distance, large interference is not caused. In regard to the change of the disposition of the CSI-RS, even when complicated mapping information is not sent from the base station to the terminal, the CSI-RS can be received even when changed to the Extended Cell DTX mode.

Third Embodiment

A third embodiment is a third example of the disposition of a CSI-RS as an additional reference signal. In the third embodiment, in order to secure the number of multiplexes of a CSI-RS and reduce interference of a CSI-RS between cells, when changing to the Extended Cell DTX mode, a CSI-RS is disposed over a plurality of frames.

In the third embodiment, as in the second embodiment, at the normal time at which Extended Cell DTX is not performed, CSI-RSs between the nearest cells are orthogonally multiplexed (using different REs) in the same subframe other than the subframes #0 and #5, and CSI-RSs between other separate cells are multiplexed with different subframes. As a mapping rule of CSI-RSs in case of changing to the Extended Cell DTX mode, a mapping rule is defined such that neighboring frames as well as the subframe #4 or #9 in the same frame are used, and the change to the subframe #4 or #9 of a plurality of frames is made. That is, in case of disposing CSI-RSs in the subframe #4 or #9, the CSI-RSs are dispersed in other frames as well as the same frame.

Figure 11:
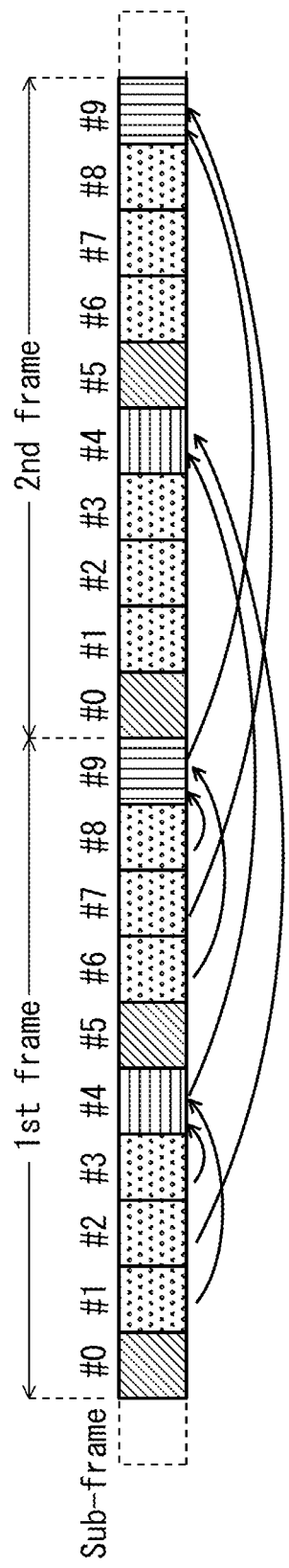
FIG. 11 is a diagram showing a disposition example of a subframe which transmits a CSI-RS in a plurality of subframes during the execution of Extended Cell DTX in a third embodiment.

FIG. 11 is a diagram showing a disposition example of a subframe which transmits a CSI-RS in a plurality of frames during the execution of Extended Cell DTX in the third embodiment. FIG. 11 shows an example where CSI-RSs are mapped over a plurality of frames, for example, over two frames. Here, in regard to the first half of the first frame, the CSI-RSs of the subframes #1 and #3 are changed and aggregated to the subframe #4 of the first frame, and the CSI-RSs of the subframes #2 and #4 are changed and aggregated to the subframe #4 of the second frame. Similarly, in regard to the second half of the first frame, the CSI-RSs of the subframes #6 and #8 are changed and aggregated to the subframe #9 of the first frame, and the CSI-RSs of the subframes #7 and #9 are changed and aggregated to the subframe #9 of the second frame. In this case, the interval at which a CSI-RS of a certain cell is transmitted increases; however, when the Extended Cell DTX mode is put, it is assumed that the number of terminals is small. Therefore, it is considered that there is no problem even when CSI-RSs are not transmitted frequently as much.

As in the second embodiment, a subframe number which is changed to an MBSFN subframe may be notified with MBSFN-SubframeConfig included in SIB2 of RRC information elements as the control signal of the upper-level layer. In MBSFN-SubframeConfig, as subframeAllocation, a subframe which acts as an MBSFN subframe is notified. Here, in case of changing to the Extended Cell DTX mode, as shown in FIG. 11, when CSI-RSs are aggregated over two frames, after oneFrame is used with subframeAllocation of MBSFN-SubframeConfig, the subframes #1, #2, #3, #6, #7, and #8 are set as MBSFN subframes, the radioframeAllocationPeriod is set to n1. In addition, the terminal finds a subframe which is changed to an MBSFN subframe, but do not find a frame in which CSI-RSs are aggregated to the subframe #4 or #9. That is, since this is not distinguished from the operation of the second embodiment, the number of frames over which CSI-RSs are aggregated is separately notified.

Configuration and Operation of Base Station

Figure 12:
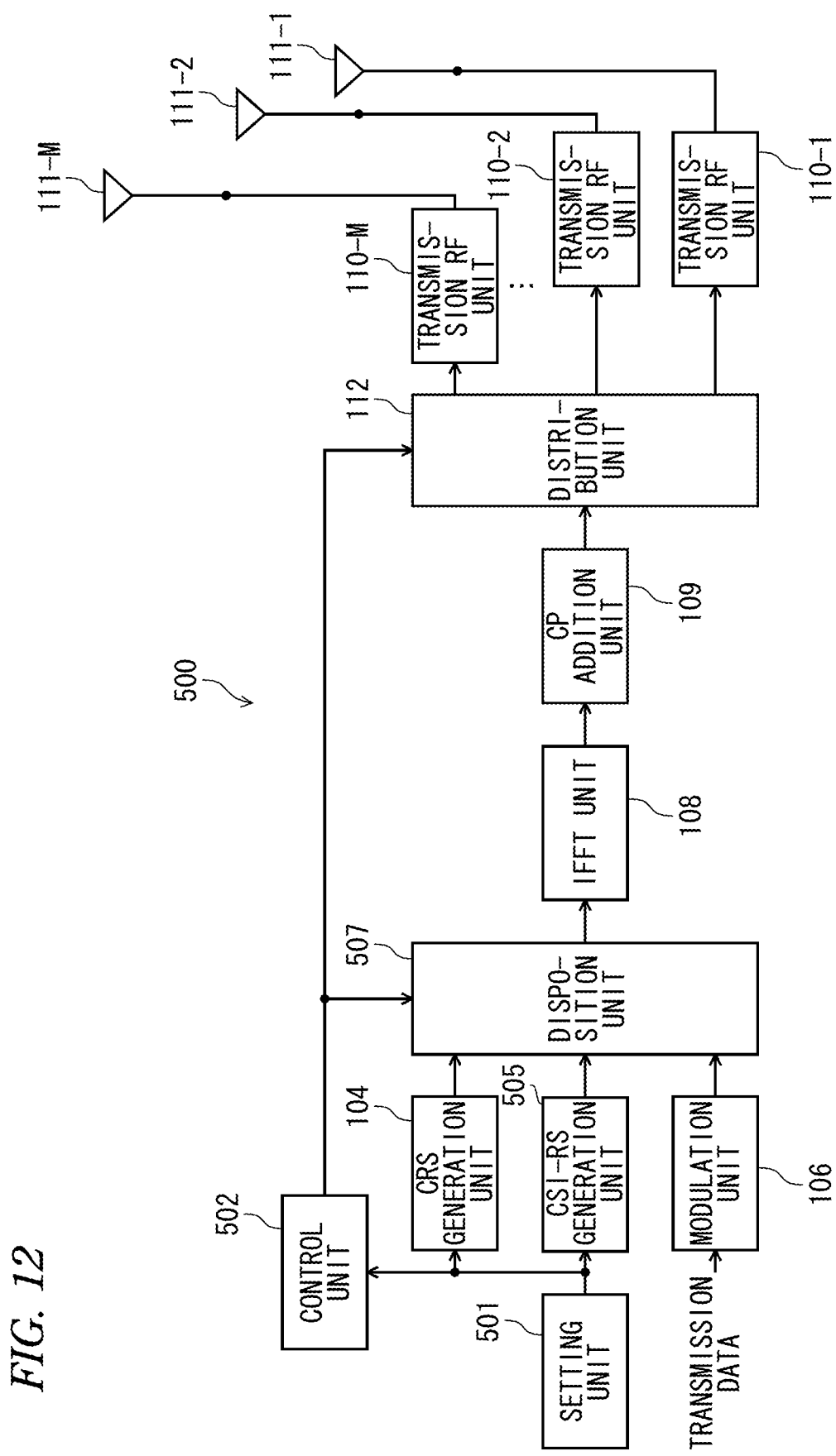
FIG. 12 is a block diagram showing the configuration of a base station in the third embodiment.

FIG. 12 is a block diagram showing the configuration of a base station 500 in the third embodiment. The base station 500 is different from the base station 100 of the first embodiment shown in FIG. 4 in that the operations of a setting unit 501, a control unit 502, a CSI-RS generation unit 505, and a disposition unit 507 are different. Other parts are the same as those in the first embodiment, and description thereof will not be repeated.

The operation of the characteristic base station 500 in the third embodiment will be described. The setting unit 501 outputs setting information including CSI-RS disposition information at the normal time (normal mode) and during the execution of Extended Cell DTX (Extended Cell DTX mode). The control unit 502 performs operation control relating to CSI-RS transmission in each mode on the basis of the setting information from the setting unit 501. When changing from the normal mode to the Extended Cell DTX mode, the control unit 502 outputs control information for reporting a subframe number to be changed to an MBSFN subframe to the disposition unit 507, transmits the subframe number to be changed to the MBSFN subframe and the number of frames over which CSI-RSs are aggregated as the control signal of the upper-level layer, and gives notification to the terminal.

The CSI-RS generation unit 505 generates a CSI-RS on the basis of the setting information input from the setting unit 501 at the normal time and during the execution of Extended Cell DTX. At the normal time, the disposition unit 507 orthogonally multiplexes CSI-RSs between the nearest cells in the same subframes from the subframes #1, #2, #3, #4, #6, #7, #8, and #9, and multiplexes CSI-RSs between other separate cells with different subframes. During the execution of Extended Cell DTX, for a subframe which is changed to an MBSFN subframe, the disposition unit 507 changes a CSI-RS from among CSI-RSs multiplexed to the subframes #1, #2, #3, #4, #6, #7, #8, and #9 to the subframe #4 or #9 and multiplexes the CSI-RS over a plurality of frames while keeping relative CSI-RS multiplex-disposition in the subframe.

Configuration and Operation of Terminal (Mobile Station)

Figure 13:
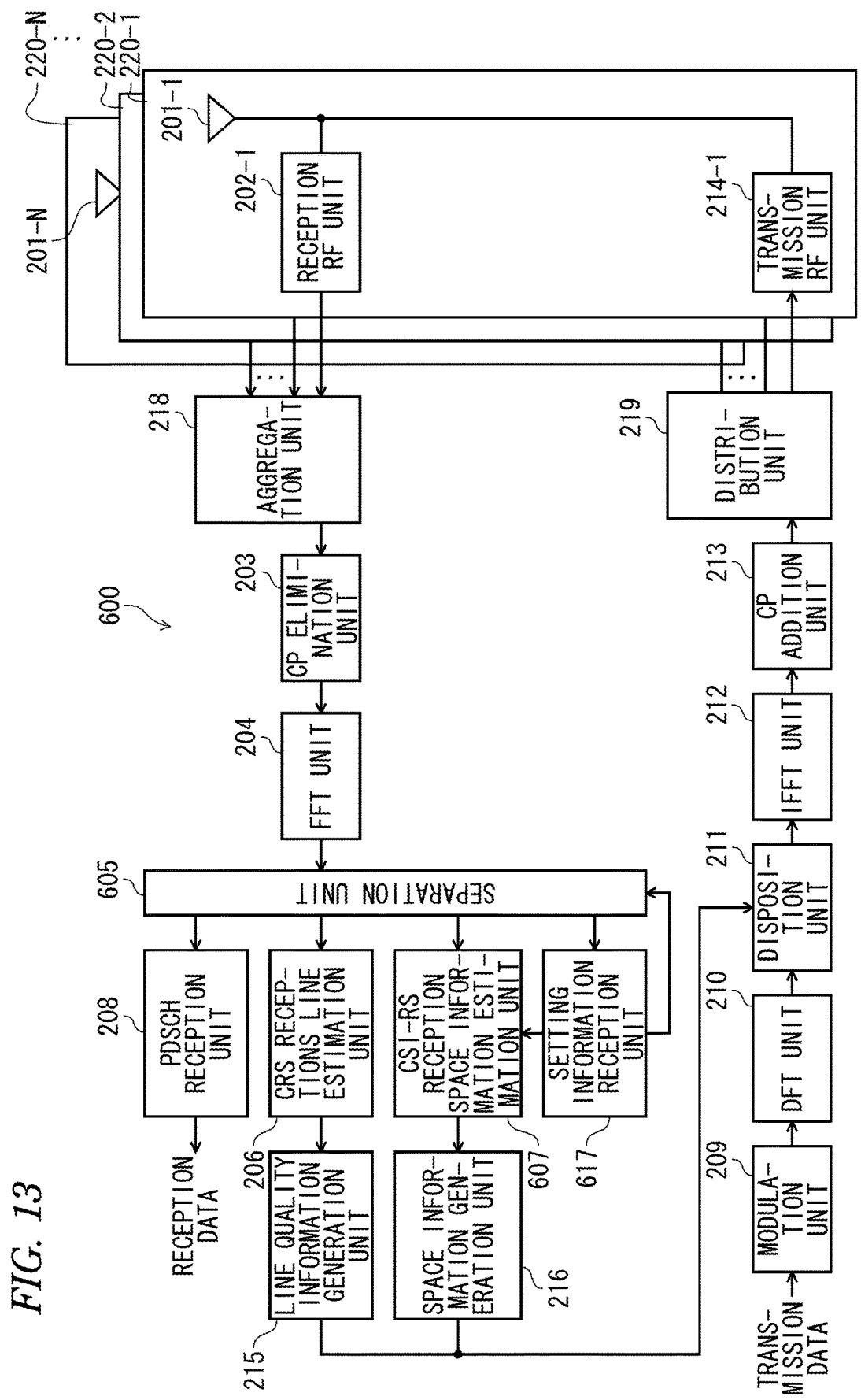
FIG. 13 is a block diagram showing the configuration of a terminal in the third embodiment.
Figure 14:
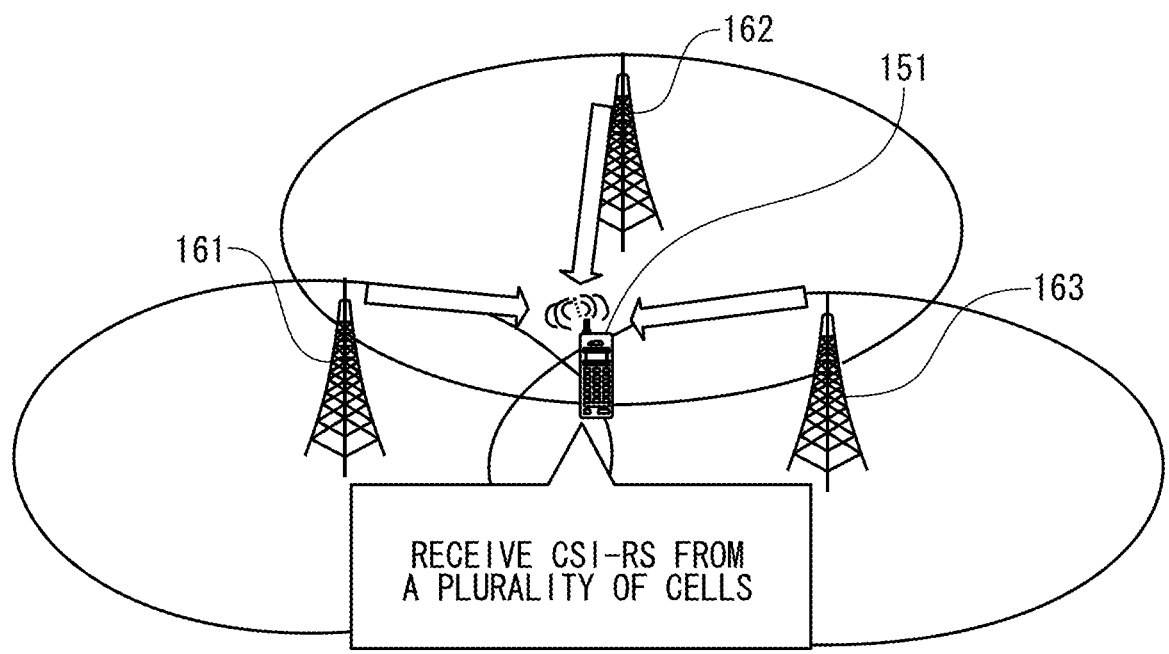
FIG. 14 is a schematic view when a terminal which is given support of CoMP from a plurality of base stations.

FIG. 13 is a block diagram showing the configuration of a terminal 600 in the third embodiment. The terminal 600 is different from the terminal 200 of the first embodiment shown in FIG. 5 in that the operations of a separation unit 605, a CSI-RS reception space information estimation unit 607, and a setting information reception unit 617 are different. Other parts are the same as those in the first embodiment, and description will not be repeated.

The operation of the characteristic terminal 600 in the third embodiment will be described. The separation unit 605 acquires the control signal of the upper-level layer including the setting information from the signal input from the FFT unit 204, and outputs the control signal to the setting information reception unit 617. The setting information reception unit 617 reads the setting information including the CSI-RS disposition information from the control signal input from the separation unit 605, and outputs the setting information to the separation unit 605. The setting information reception unit 617 outputs the setting information, such as a back-diffusion code for receiving and demodulating a CSI-RS, to the CSI-RS reception space information estimation unit 607.

The separation unit 605 separates the frequency domain signal input from the FFT unit 204 on the basis of the setting information received with the previous subframes, acquires the CSI-RS, and outputs the CSI-RS to the CSI-RS reception space information estimation unit 607. At this time, the separation unit 605 acquires the CSI-RS in accordance with mapping of the CSI-RS to each subframe by the base station, and outputs the CSI-RS to the CSI-RS reception space information estimation unit 607.

At the normal time and during the execution of the Extended Cell DTX, the CSI-RS reception space information estimation unit 607 performs space information estimation of the downlink transmitted from the base station to the mobile station device itself by the CSI-RS input from the separation unit 605 using the setting information of the CSI-RS input from the setting information reception unit 617.

According to the third embodiment, the operation of the second embodiment is partially changed, and CSI-RS mapping is expanded over a plurality of frames, thereby increasing the number of multiplexes of CSI-RSs in a plurality of cells and multiplexing necessary CSI-RSs while securing temporal orthogonality.

Although in the second embodiment and the third embodiment, when the Extended Cell DTX mode is not executed (the normal mode), description has been made assuming that CSI-RSs are transmitted with all subframes other than the subframes #0 and #5, actually, CSI-RSs may not be transmitted with all subframes capable of transmitting CSI-RSs. In this case, taking into consideration of having been changed to the Extended Cell DTX mode, CSI-RSs are disposed and transmitted in advance as described below.

(1): When transmitting a CSI-RS, first, the CSI-RS is transmitted preferentially using the subframe #4 or #9. Only with the use of the subframe #4 or #9, when the number of subframes is insufficient, CSI-RSs are transmitted using a necessary number of subframes from among other subframes (#1 to #3 and #6 to #8). In this case, however, it is assumed that, during the execution of the Extended Cell DTX mode, the change to Fake MBSFN subframes is performed from subframes which do not transmit CSI-RSs.

(2): Similarly to (1), when transmitting a CSI-RS, the CSI-RS is transmitted preferentially using the subframe #4 or #9. When CSI-RSs are transmitted at an interval of 20 ms or 40 ms in each cell, the CSI-RSs are transmitted with the subframe #4 or #9 of different frames for each CSI-RS group. Similarly to (1), only with the use of the subframe #4 or #9, when the number of subframes is insufficient, CSI-RSs are transmitted with other subframes, and it is assumed that the change to Fake MBSFN subframes is performed from subframes which do not transmit CSI-RSs.

(3): Contrary to (1) or (2), when transmitting a CSI-RSs, the CSI-RS is transmitted preferentially using subframes (#1 to #3 and #6 to #8) other than the subframe #4 or #9. The change to Fake MBSFN subframes is performed from subframes which do not transmit CSI-RSs from among the subframes (#1 to #3 and #6 to #8), and thereafter, the change of subframes which transmit CSI-RSs is performed.

(4): Similarly to (3), when transmitting a CSI-RS, the CSI-RS is transmitted preferentially using subframes (#1 to #3 and #6 to #8) other than the subframe #4 or #9. The change to Fake MBSFN subframes is performed from subframes which transmit the same number of CSI-RSs as the subframe #4 or #9, and thereafter, the change of subframes which do not transmit CSI-RSs is performed.

Although in the foregoing embodiments, a case where CSI-RSs are aggregated to the subframes #4 and #9 incapable of acting as MBSFN subframes and transmitted, the invention is not limited thereto, and other signals may be aggregated to the subframes #4 and #9. For example, the invention may be applied to a PDSCH, signaling of the upper-level layer included in the PDSCH, or the like.

Even when the Extended Cell DTX mode is not executed, when a subframe acts as an MBSFN subframe, CSI-RSs or the like may be automatically aggregated to the subframe #4 or #9. Since the terminal does not distinguish between real MBSFN subframes or Fake MBSFN subframes, in any cases, the base station just notifies the change to MBSFN subframes.

If the change to the Extended Cell DTX mode is possible, it is considered that the number of spatial multiplexes of a transmission signal may be small as much. For this reason, if unnecessary, eight transmission antennas may be aggregated to four transmission antennas. In this case, since the number of usable subframes increases, it is possible to increase the number of multiplexes of a CSI-RS in a plurality of cells.

The subframe interval may be changed from 10 and set to an interval of 3 or 7 to change the transmission timing of CSI-RSs between adjacent cells. However, transmission is not performed with a subframe corresponding to BCH or SIB. In this case, interference to other cells applied to CSI-RSs becomes various patterns, and when averaging, measurement (line estimation, space information estimation, or the like) can be easily performed taking into consideration the influence of other cells.

It should be noted that one skilled in the art can make various modifications and changes based on the specification and the well-known technology without departing from the gist and scope of the invention, which are also included in the invention to be protected. The respective constitutional elements in the foregoing embodiments can be arbitrarily combined without departing from the gist of the invention.

Although the foregoing embodiments, an antenna has been described, the same may apply to an antenna port. An antenna port indicates a logical antenna which is constituted by one or a plurality of physical antennas. That is, the antenna port is not limited as indicating a single physical antenna, and may indicate an array antenna having a plurality of antennas, or the like. For example, in LTE, while how many physical antennas constitute the antenna port is not defined, a base station is defined as a minimum unit for transmission of different reference signals. The antenna port may be defined as a minimum unit in multiplying the weight of a precoding vector.

In the embodiments, the cases in which the invention is realized by hardware have been described. However, the invention may be realized by software.

Each functional block used to describe the embodiment and each modification is typically implemented by an LSI, which is an integrated circuit. Each functional block may be integrated into one chip, or a portion of or the entire functional block may be integrated into one chip. Here, the LSI is used as the integrated circuit, but the integrated circuit may be called an IC, a system LSI, a super LSI, or an ultra LSI according to the degree of integration.

In addition, a circuit integration method is not limited to LSI, but circuit integration may be implemented by a dedicated circuit or a general-purpose processor. After the LSI circuit is manufactured, a programmable FPGA (Field Programmable Gate Array) or a reconfigurable processor capable of reconfiguring the connection of circuit cells in the LSI circuit or the setting thereof may be used.

When a circuit integration technique capable of replacing LSI appears with the progress of semiconductor technology or other technologies derived from the semiconductor technology, the technique may be used to integrate the functional blocks. For example, biotechnology can be applied.

This application is based on Japanese Patent Application (Japanese Patent Application No. 2010-137339) filed on Jun. 26, 2010, the disclosure of which is incorporated herein by reference in its entirety.

INDUSTRIAL APPLICABILITY

The invention has effects that the power saving effect can be maintained and the transmission of an additional reference signal, such as a CSI-RS, can be enabled, and is useful for a wireless communication device, a wireless communication method, or the like for performing inter-cell cooperative transmission/reception being studied in LTE-A, for example.

REFERENCE SIGNS LIST 100, 161, 162, 163, 300, 500: base station (cell)
101, 301, 501: setting unit
102, 302, 502: control unit
104: CRS generation unit
105, 305, 505: CSI-RS generation unit (reference signal generation unit)
106, 209: modulation unit
107, 211, 307, 507: disposition unit
108, 212: IFFT unit
109, 213: CP addition unit
110-1 to 110-M, 214-1 to 214-N: transmission RF unit
111-1 to 111-M, 201-1 to 201-N: antenna
112, 219: distribution unit
151, 200, 400, 600: terminal
171: macro cell
202-1 to 202-N: reception RF unit
203: CP elimination unit
204: FFT unit
205, 405, 605: separation unit
206: CRS reception line estimation unit
207, 407, 607: CSI-RS reception space information estimation unit (space estimation unit)
208: PDSCH reception unit
210: DFT unit
215: line quality information generation unit
216: space information generation unit
217, 417, 617: setting information reception unit
218: aggregation unit
220-1 to 220-N: RF block

The invention claimed is:

1. An integrated circuit comprising:
   circuitry, which, in operation, controls
      receiving a downlink signal including a Channel State Information (CSI) reference signal mapped in a subframe other than subframes that can be used for Multimedia Broadcast multicast service Single Frequency Network (MBSFN) transmission, the subframes including at least one subframe actually used for the MBSFN transmission and another subframe reserved for the MBSFN transmission; and
      transmitting Channel Quality Indicator (CQI) information, the CQI information being estimated using the CSI reference signal.

2. The integrated circuit according to claim 1, wherein the CSI reference signal is mapped by multiplexing the CSI reference signal on a frequency region at at least one Orthogonal Frequency Division Multiplexing (OFDM) symbol.

3. The integrated circuit according to claim 1, wherein
the CSI reference signal is mapped by multiplexing the
   CSI reference signal on a part of a plurality of subcarriers of at least one Orthogonal Frequency Division
   Multiplexing (OFDM) symbol.

4. The integrated circuit according to claim 1, wherein
the CSI reference signal is mapped by using two or more
   Orthogonal Frequency Division Multiplexing (OFDM)
   symbols and by multiplexing the CSI reference signal
   on a frequency region and a time region.

5. The integrated circuit according to claim 1, wherein
in the subframe to which the CSI reference signal is
   mapped, a number of symbols on which the CSI
   reference signal is mapped is smaller than a number of
   symbols on which a cell-specific reference signal
   (CRS) is mapped.

\* \* \* \* \*